(12) United States Patent
Hayashi

(10) Patent No.: US 12,312,181 B2
(45) Date of Patent: May 27, 2025

(54) TRANSPORT APPARATUS FOR PIECES TO BE TRANSPORTED

(71) Applicant: KYOTO SEISAKUSHO CO., LTD., Kyoto (JP)

(72) Inventor: Kentaro Hayashi, Kyoto (JP)

(73) Assignee: Kyoto Seisakusho Co., Ltd., Kyoto (JP)

( * ) Notice: Subject to any disclaimer, the term of this patent is extended or adjusted under 35 U.S.C. 154(b) by 67 days.

(21) Appl. No.: 18/002,283

(22) PCT Filed: Jun. 29, 2021

(86) PCT No.: PCT/JP2021/024562
§ 371 (c)(1),
(2) Date: Dec. 19, 2022

(87) PCT Pub. No.: WO2022/009735
PCT Pub. Date: Jan. 13, 2022

(65) Prior Publication Data
US 2023/0234789 A1    Jul. 27, 2023

(30) Foreign Application Priority Data
Jul. 8, 2020 (JP) ................................ 2020-118091

(51) Int. Cl.
*B65G 47/68* (2006.01)
*B65G 17/34* (2006.01)
*B65G 47/84* (2006.01)

(52) U.S. Cl.
CPC ........... *B65G 47/68* (2013.01); *B65G 17/345* (2013.01); *B65G 47/841* (2013.01)

(58) Field of Classification Search
CPC .... B65G 47/68; B65G 17/345; B65G 47/841; B65G 47/684; B65G 54/02; B65G 47/842
See application file for complete search history.

(56) References Cited

U.S. PATENT DOCUMENTS 9,643,794 B2 *  5/2017  Wipf ...................... B65G 47/71
9,873,573 B2 *  1/2018  Wiesmann ........... B65G 47/962
(Continued)

FOREIGN PATENT DOCUMENTS

CN         109415171 A  *  3/2019  ............. B65B 35/46
DE    102012210329 A1  * 12/2013  ............. B65B 35/24
(Continued)

OTHER PUBLICATIONS

International Search Report (with partial translation) dated JSeptember 21, 2021, issued in corresponding International Patent Application No. PCT/JP2021/024562.

(Continued)

*Primary Examiner* — Gene O Crawford
*Assistant Examiner* — Abby A Jorgensen
(74) *Attorney, Agent, or Firm* — Morgan, Lewis & Bockius LLP

(57) ABSTRACT

In a run-up region provided upstream, in the transport direction, of a branch point in a main transport passage, a main transport mechanism and a branching transport mechanism both transport a transport case. When the transport case is fed to a branching transport passage, the main transport mechanism finishes transporting the transport case before the transport case reaches the branch point.

3 Claims, 14 Drawing Sheets

(56) References Cited

U.S. PATENT DOCUMENTS

| | | | |
|---|---|---|---|
| 2006/0042911 A1 | | 3/2006 | Nakajima et al. |
| 2015/0136564 A1 | | 5/2015 | Hurni et al. |
| 2016/0152414 A1* | | 6/2016 | Aumann ................ B65G 54/02 |
| | | | 198/867.01 |

FOREIGN PATENT DOCUMENTS

| DE | 102013223494 A1 * | 5/2015 | ............ B65G 19/02 |
|---|---|---|---|
| EP | 3034441 A1 * | 6/2016 | ............ B65G 54/02 |
| EP | 3196653 A1 * | 7/2017 | ............ B25J 18/04 |
| EP | 3473564 A1 * | 4/2019 | ............ B65B 35/46 |
| JP | 2009208902 A * | 9/2009 | |
| JP | 4734535 B2 | 7/2011 | |
| JP | 5193387 B1 * | 5/2013 | |
| JP | 2015-525176 A | 9/2015 | |
| JP | 6155406 B1 * | 6/2017 | ............ B65B 35/46 |
| JP | 6453383 B2 | 1/2019 | |
| JP | 2019018909 A * | 2/2019 | |
| JP | 6495204 B2 | 4/2019 | |
| JP | 2020153845 A * | 9/2020 | ........... B07C 5/3416 |

OTHER PUBLICATIONS

Notice of Submission of Publication (Notice) dated May 16, 2023, issued in corresponding Japanese Patent Application No. 2020-118091.

* cited by examiner

TRANSPORT APPARATUS FOR PIECES TO BE TRANSPORTED

TECHNICAL FIELD

The present invention relates to a transport apparatus for pieces to be transported (abbreviated to transported pieces), for use for transport of transported pieces.

BACKGROUND ART

JP-T-2015-525176 discloses, as an apparatus for transporting articles, a linear transport apparatus that employs a linear motor. This linear transport apparatus includes a stator of the linear motor, on which an electric magnet is arranged, and a transport member, on which a permanent magnet is arranged. The electric magnet and the permanent magnet together form a linear motor system. The transport member has a holder or handling holder so that holding a product with the holder or handling holder and moving the transport member permits the product to be transported.

CITATION LIST

Patent Literature

Patent Document 1: JP-T-2015-525176

SUMMARY OF INVENTION

Technical Problem

When a transport apparatus as described above is used for the transport of articles in a manufacturing process, the transport direction of the articles may sometimes need be branched, in which case transporting a product held by a holder or handling holder may make the branching of the transport direction difficult.

Against such a background, an object of the present invention is to provide a transport apparatus for transported pieces on which, at a branch point in a transport passage, a transported piece can be transported in either of branch passages as desired.

Solution to Problem

To achieve the above object, according to one aspect of the present invention, a transport apparatus for a transported piece includes: a main transport passage in which the transported piece is transported; a branching transport passage that connects to a branch point provided in the main transport passage and that extends in a direction different from the main transport passage; a main transport mechanism that transports the transported piece in the main transport passage; and a branching transport mechanism that transports the transported piece in the branching transport passage. In a run-up region provided upstream, in the transport direction, of the branch point in the main transport passage, the main transport mechanism and the branching transport mechanism both transport the transported piece. When the transported piece is fed to the branching transport passage, the main transport mechanism finishes transporting the transported piece before the transported piece reaches the branch point.

With this configuration, letting the main transport mechanism continue operating at the branch point permits the transported piece to return to the main transport passage, and making the main transport mechanism finish transporting the transported piece there permits it to be fed to the branching transport passage, easily and reliably. It is thus possible to transport the transported piece in the desired transport passage.

In the configuration described above, preferably, the main transport mechanism include: a rail arranged along the main transport passage; a first holding shuttle and a second holding shuttle that are arranged on the rail and that hold the rear face and the front face, respectively, of the transported piece in the transport direction; and a linear driver configured to drive the first and second holding shuttles independently. Preferably, when the transported piece is fed to the branching transport passage, the linear driver moves the first and second holding shuttles away from the transported piece before the transported piece reaches the branch point. With this configuration, even by use of a linear transport mechanism, it is possible to transport the transported piece in the desired transport passage easily and reliably.

In the configuration described above, preferably, in the run-up region, the linear driver accelerates the second holding shuttle such that its movement speed is higher than the transport speed of the branching transport mechanism, and decelerates the first holding shuttle such that its movement speed is lower than the transport speed of the branching transport mechanism.

In the configuration described above, preferably, the branching transport mechanism is a top chain conveyor on top of which the transported piece can be arranged. Preferably, a bottom face guide is arranged in the main transport passage so as to support the transported piece by making contact with its bottom face.

In the configuration described above, preferably, the main transport passage has a straight part and a curved part, with the curved part connected to the straight part at the branch point. Preferably, the branching transport passage connects to the downstream end of the straight part in the transport direction, and extends in a direction extending the straight part.

Advantageous Effects of Invention

According to one aspect of the present invention, it is possible to provide a transport apparatus for transported pieces on which, at a branch point in a transport passage, a transported piece can be transported in either of branch passages as desired.

DESCRIPTION OF EMBODIMENTS

Hereinafter, an embodiment of the present invention will be described with reference to the accompanying drawings.
<Transport Apparatus A>

Figure 1:
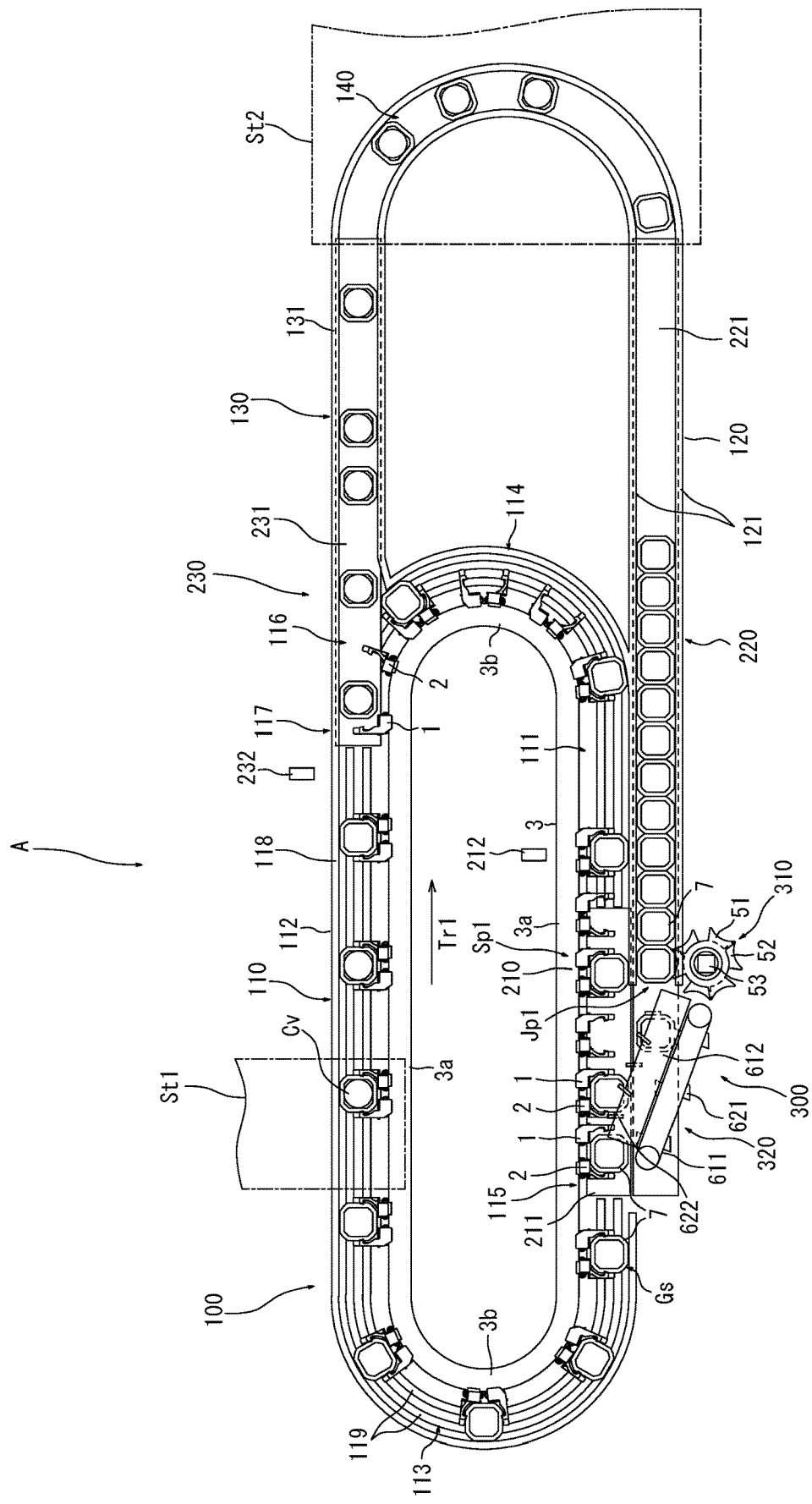
FIG. 1 is an outline layout diagram of a transport apparatus for transporting, as transported pieces, transport cases.
Figure 2:
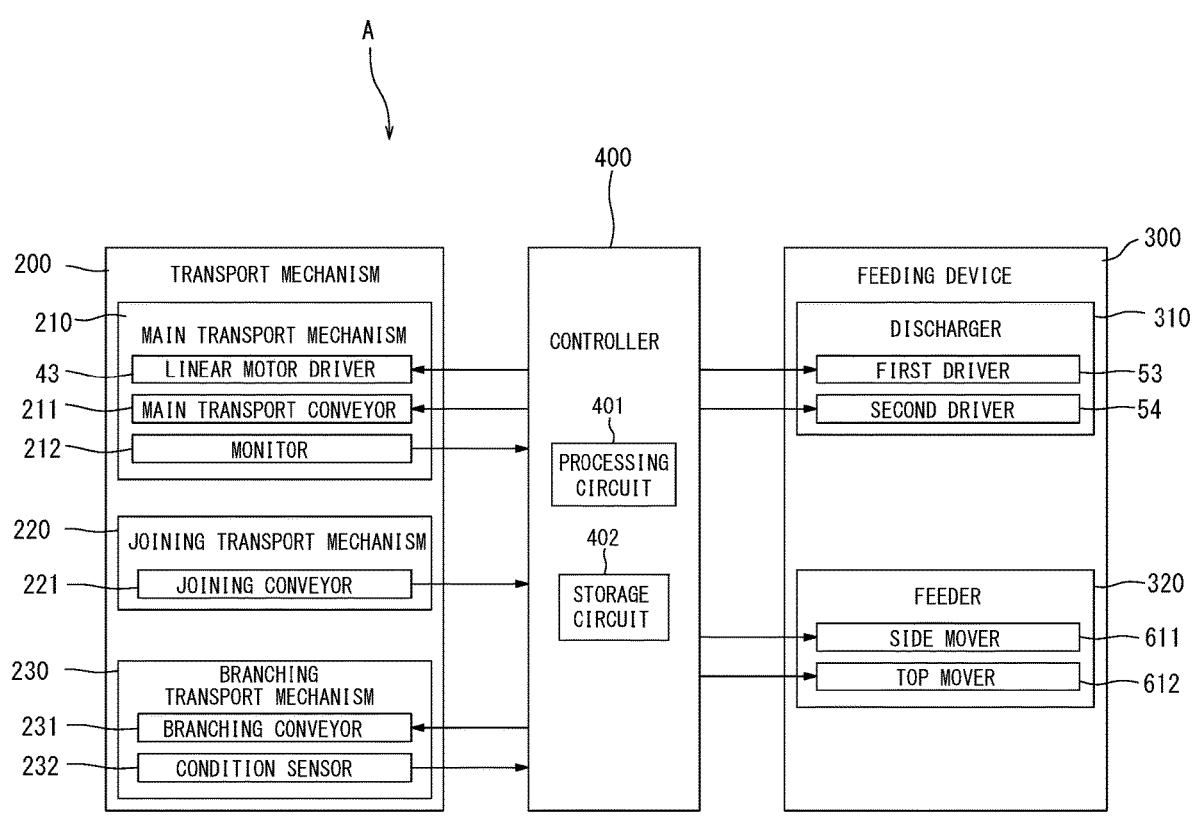
FIG. 2 is a functional block diagram of the transport apparatus.

FIG. 1 is an outline layout diagram of a transport apparatus A for transporting, as transported pieces, transport cases 7. FIG. 2 is a functional block diagram of the transport apparatus A. As shown in FIG. 1, the transport apparatus A is built in a manufacturing process of an unillustrated product, and transports, as transported pieces, transport cases 7 by use of a linear motor.

As shown in FIGS. 1 and 2, the transport apparatus A includes a transport passage 100, a transport mechanism 200, a feeding device 300, and a controller 400. The transport cases 7 are transported along the transport passage 100.
<Transport Passage 100>

The transport passage 100 includes a main transport passage 110, a joining transport passage 120, and a branching transport passage 130. The main transport passage 110 is a transport passage in a loop form (in the following description sometimes referred to as the small loop). The joining transport passage 120 joins the main transport passage 110. The branching transport passage 130 branches off the main transport passage 110. In the transport passage 100, the joining transport passage 120 and the branching transport passage 130 are connected together by, for example, a curved transport passage 140. Thus, in the transport passage 100, part of the main transport passage 110, the joining transport passage 120, the branching transport passage 130, and the curved transport passage 140 are formed in a loop form (in the following description sometimes referred to as the large loop). Here, a loop form denotes a closed geometry with no ends left unconnected. In the embodiment, the transport cases 7 are transported clockwise around either of the small-loop and large-loop transport passages.

Accordingly, in the following description, the clockwise direction around the transport passage 100 is referred to as the transport direction Tr1. The forward side in the transport direction Tr1 is referred to as the "downstream side in the transport direction or, for a position within a member, the "front side in the transport direction", and the opposite side is referred to as the "upstream side in the transport direction or, for a position within a member, the "rear side in the transport direction". The direction pointing out of the area enclosed by a loop-form transport passage is taken as outward in a direction intersecting the transport direction Tr1, and is often referred to simply as "outward". The direction opposite to "outward" in a direction intersecting the transport direction Tr1 is often referred to as "inward".

As shown in FIG. 1, the main transport passage 110 in the transport passage 100 has a first operating station St1 that performs a predetermined operation to the transport cases 7. The curved transport passage 140 has a second operating station St2 that performs an operation different from that which the first operating station St1 performs. Any other operating station than the first and second operating stations St1 and St2 may be provided.
<Main Transport Passage 110>

The main transport passage 110 has a first straight part 111, a second straight part 112, a first curved part 113, and a second curved part 114. The first and second straight parts 111 and 112 are arranged parallel to each other. The first curved part 113 couples together a downstream-side part of the first straight part 111 in the transport direction and an upstream-side part of the second straight part 112 in the transport direction. The second curved part 114 couples together a downstream-side part of the second straight part 112 in the transport direction and an upstream-side part of the first straight part 111 in the transport direction.

In the main transport passage 110, the first and second curved parts 113 and 114 are each in an arc form as seen in a plan view, with no limitation intended. Instead of an arc form, any curved form may be adopted that lessens the centrifugal force that acts on a transport case 7 when it moves from a straight to a curved part or along a curved part.

The main transport passage 110 is formed in a loop form (the small loop) as a result of the first straight part 111, the first curved part 113, the second straight part 112, and the second curved part 114 being connected in this order.

In the main transport passage 110, a transport case 7 is transported by a main transport mechanism 210, which will be described later, in the transport mechanism 200. In the main transport passage 110, the transport case 7 is transported along the first straight part 111, the first curved part 113, the second straight part 112, and the second curved part 114 in this order.

The transport case 7 is transported in the transport direction Tr1, which is the clockwise direction around the main transport passage 110. The main transport passage 110 has a junction point 115 and a branch point 116. The junction point 115 is arranged in a downstream-side end part of the first straight part 111 in the transport direction Tr1. At the junction point 115, the joining transport passage 120 joins the main transport passage 110.

The branch point 116 is arranged in a downstream-side end part of the second straight part 112 in the transport direction Tr1. At the branch point 116, the branching transport passage 130 branches off the main transport passage 110. In a downstream-side end part of the second straight part 112 in the transport direction Tr1, a run-up region 117 is provided. The run-up region 117 is the region where the main transport passage 110 and the branching transport passage 130 overlap.

Outward of the main transport passage 110, a guide 118 is arranged. The guide 118 is a plate member arranged along the main transport passage 110. While the transport case 7 is transported in the main transport passage 110, it is guided by staying in contact with the guide 118.

In the main transport passage 110, the guide 118 may make contact with the transport case 7 only when the position or angle of the transport case 7 with respect to the direction orthogonal to the transport direction is likely to swerve or when the centrifugal force acting on the transport case 7 is likely to be unbearable by the main transport mechanism 210.

Preferably, the guide 118 is formed of a material that has low friction against the transport case 7 when in contact with it and that does not wear easily. This is not meant as any limitation. Instead, any other configuration, such as rotatable rollers arranged in a row along the main transport passage 110, may be adopted that can adjust the position of the transport case 7 in the direction orthogonal to the transport direction to have low friction against the transport case 7.

In the embodiment, the guide 118 is provided only outward of the main transport passage 110. This is not meant as any limitation. Another guide 118 may be provided also inward of the main transport passage 110.

While transporting the transport case 7, the main transport mechanism 210 holds, with respect to the transport direction Tr1, the downstream-side (hereinafter also referred to as front-side) face of the transport case 7 and the upstream-side (hereinafter also referred to as rear-side) face of the transport case 7. In the main transport passage 110, a bottom face guide 119 is also arranged that supports the bottom face of the transport case 7.

The bottom face guide 119 comprises, for example, two rail-form members that extend parallel along the main transport passage 110, with no limitation intended. It may instead comprise an array of rollers along the transport direction, or a plate-form member formed of a material with a low friction coefficient against the transport case 7. For the bottom face guide 119, any structure can be adopted that supports the transport case 7 from under its bottom face and that exhibits low resistance against the transport by the main transport mechanism 210.

In a configuration where the main transport mechanism 210 can hold the transport case 7 such that it does not drop down, the bottom face guide 119 may be omitted. In the main transport passage 110, near the junction point 115 and the branch point 116, a transport mechanism such as a top chain conveyor may be arranged that moves the transport case 7 in the transport direction while supporting it from under its bottom face. In the part of the main transport passage 110 where the transport mechanism that moves the transport case 7 while supporting it from under its bottom face is arranged, the bottom face guide 119 is omitted.

As shown in FIG. 1, in an upstream-side part of the second straight part 112 of the main transport passage 110 in the transport direction Tr1, the first operating station St1 is arranged. The first operating station St1 performs, for example, an operation of arranging a container Cv in the transport case 7. This is not meant as any limitation. It may instead perform any operation other than arranging a container Cv, or perform another operation in addition to arranging a container Cv.

<Joining Transport Passage 120>

The joining transport passage 120 extends along the first straight part 111 of the main transport passage 110. In the transport passage 100, the joining transport passage 120 is straight. This is not meant as any limitation. It may have as at least a part of it a curved part. In the joining transport passage 120, the transport case 7 is transported by a joining transport mechanism 220, which will be described later, in the transport mechanism 200.

In the joining transport passage 120, joining guides 121 are arranged. In the joining transport passage 120, the joining guides 121 are arranged parallel to the guide 118 extending along the first straight part 111. The joining guides 121 have a structure similar to the guide 118. They may adopt, like the guide 118, any alternative configuration.

In the joining transport passage 120, the transport case 7 is transported by the joining transport mechanism 220 while being guided by the joining guides 121 and the guide 118. At the downstream end of the joining transport passage 120 in the transport direction, the feeding device 300 is arranged. The feeding device 300 feeds the transport case 7 transported from the joining transport passage 120 to the main transport passage 110 with predetermined timing. The configuration and operation of the feeding device 300 will be described in detail later.

<Branching Transport Passage 130>

As shown in FIG. 1, the branch point 116 is provided at the downstream end of the second straight part 112 in the transport direction Tr1. The branching transport passage 130 extends from the branch point 116 in such a direction as to extend the second straight part 112 from its downstream end in the transport direction Tr1. In the transport passage 100, the branching transport passage 130 is straight. This is not meant as any limitation. It may have as at least part of it a curved part. In the branching transport passage 130, the transport case 7 is transported by a branching transport mechanism 230, which will be described later, in the transport mechanism 200.

In the branching transport passage 130, branching guides 131 are arranged. The branching guides 131 are arranged adjacent to each other in a direction intersecting the transport direction Tr1 of the branching transport mechanism 230. That is, the branching guides 131 are arranged opposite each other across the branching transport mechanism 230. The branching guides 131 have a structure similar to the guide 118. The branching guides 131 may adopt, like the guide 118, any alternative configuration.

In the branching transport passage 130, the outward branching guide 131 connects to the guide 118 in the second straight part 112. The inward branching guide 131 connects to the guide 118 in the second curved part 114.

<Curved Transport Passage 140>

In the transport passage 100 shown in FIG. 1, a downstream-side part of the branching transport passage 130 connects to the curved transport passage 140. The curved transport passage 140 then joins the joining transport passage 120. The curved transport passage 140 is in an arc shape as seen in a plan view. In the curved transport passage 140, the second operating station St2 is arranged that performs a predetermined operation on the container Cv arranged in the transport case 7. The downstream end of the curved transport passage 140 in the transport direction Tr1 is connected to the upstream-side end of the joining transport passage 120 in the transport direction Tr1. Having subjected to the predetermined operation in the second operating station St2, the transport case 7 is transported to the joining transport passage 120.

<Controller 400>

Next, the controller 400, which controls the transport apparatus A, will be described. As shown in FIG. 2, the controller 400 includes a processing circuit 401 and a storage circuit 402. The processing circuit 401 is a circuit that processes various kinds of information, and includes a computational circuit such as a CPU, MPU, or the like. Based on the result of the processing, the processing circuit 401 controls the transport apparatus A.

The storage circuit 402 is a circuit that includes, or is connected to, a semiconductor memory such as a ROM, a RAM, and the like, a portable memory like a flash memory, and a storage medium such as a hard disk. Various programs such as control programs and processing programs may be stored in the storage circuit 402 so that programs corresponding to processing to be performed are called and executed on the processing circuit 401 as necessary to perform the processing.

Connected to the controller 400 are: a linear motor driver 43, a main transport conveyor 211, and a monitor 212, which will be described later, in the main transport mechanism 210; a joining conveyor 221, which will be described later, in the joining transport mechanism 220; a branching conveyor 231 and a condition sensor 232 in the branching transport mechanism 230; a first driver 53 and a second driver 54 in a discharger 310, which will be described later, in the feeding device 300; and a side mover 611 and a top mover 612 in a feeder 320.

<Transport Mechanism 200>

Next, the transport mechanism 200, which transports transport cases 7, will be described in detail.

As shown in FIGS. 1 and 2, the transport mechanism 200 includes a main transport mechanism 210, a joining transport mechanism 220, and a branching transport mechanism 230. The main transport mechanism 210 is arranged in the main transport passage 110, and transports a transport case 7 in the main transport passage 110. The joining transport mechanism 220 is arranged in the joining transport passage 120, and transports a transport case 7 in the joining transport passage 120. The branching transport mechanism 230 is arranged to span from the run-up region 117 of the main transport passage 110 to the branching transport passage 130. An upstream-side end part of the branching transport mechanism 230 is where the run-up region 117 starts. The branching transport mechanism 230 transports a transport case 7 in the run-up region 117 and in the branching transport passage 130.

In the run-up region 117, the main transport mechanism 210 and the branching transport mechanism 230 can apply to a transport case 7 a force pointing to the main transport passage 110 (the second curved part 114 of it) and a force pointing to the branching transport passage 130 respectively. By the action of the main transport mechanism 210, at the branch point 116, the transport case 7 is fed to either the branching transport passage 130 or the main transport passage 110 (the second curved part 114 of it). In an upstream-side part of the run-up region 117, the transport directions of the main transport mechanism 210 and the branching transport mechanism 230 coincide. The switching of the movement of the transport case 7 at the branch point 116 will be described in detail later.

<Main Transport Mechanism 210>

Figure 3:
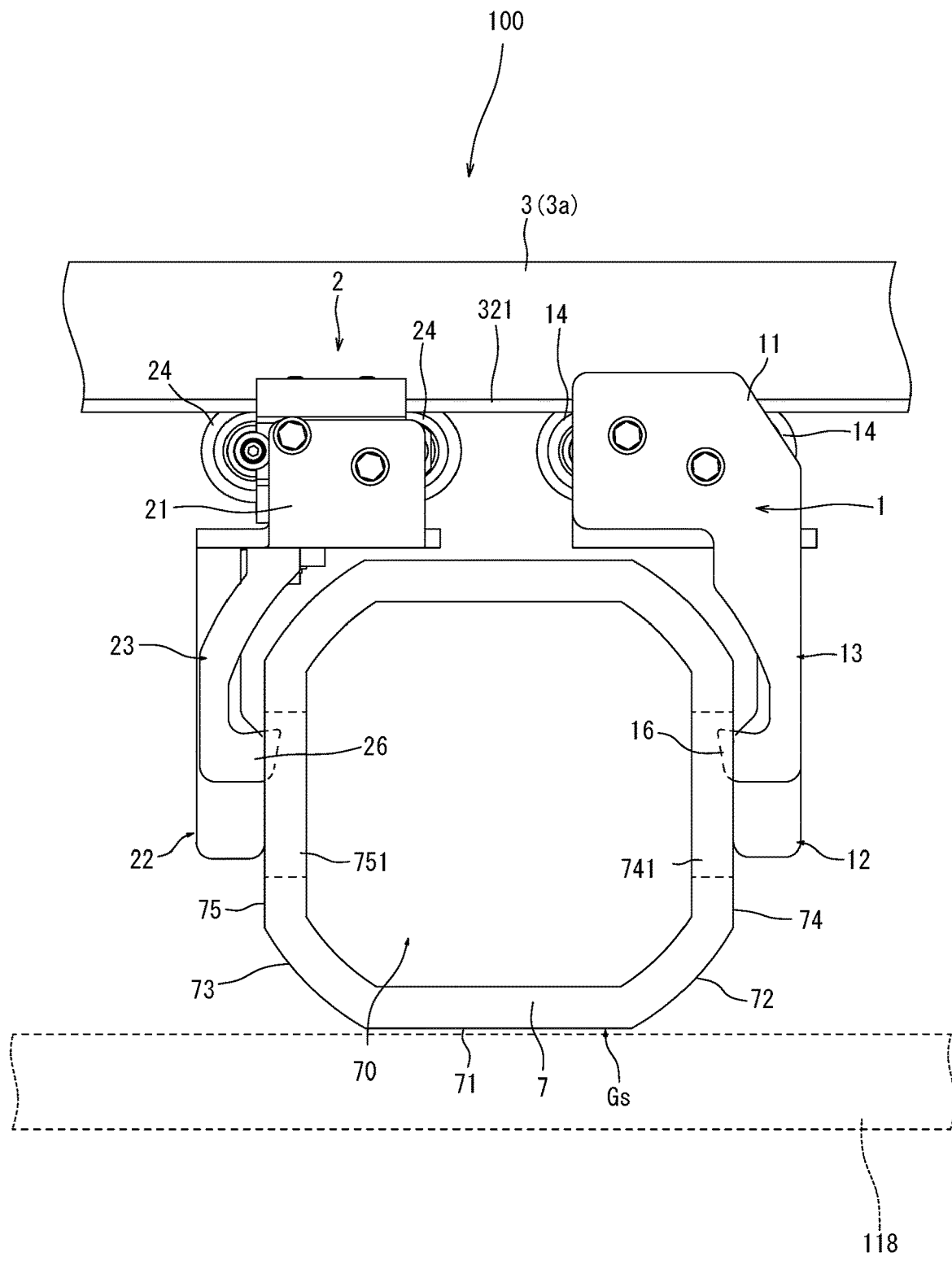
FIG. 3 is a plan view of a first holding shuttle and a second holding shuttle moving along a straight rail while holding a transport case.
Figure 4:
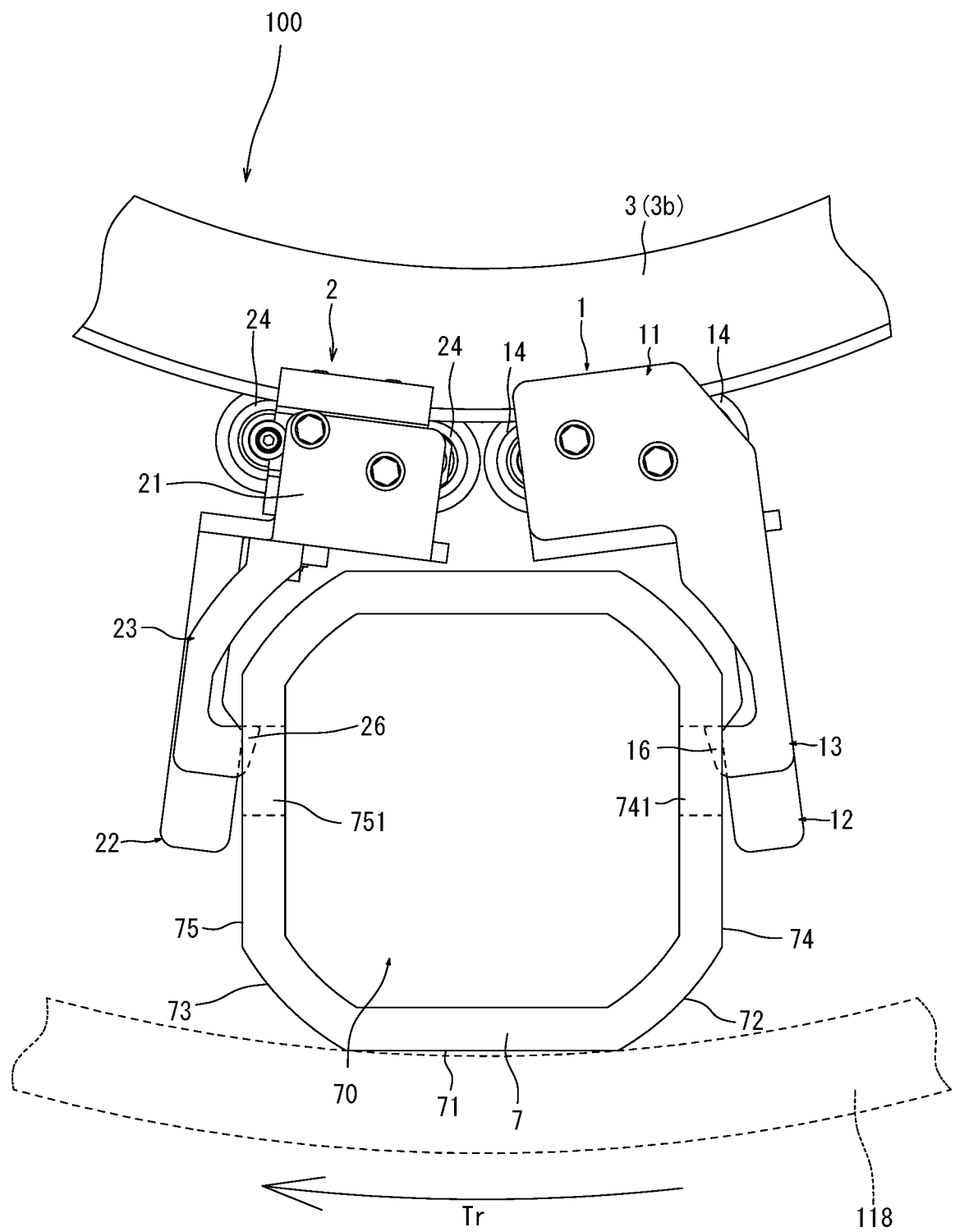
FIG. 4 is a plan view of a first holding shuttle and a second holding shuttle moving along a curved rail while holding a transport case.
Figure 5:
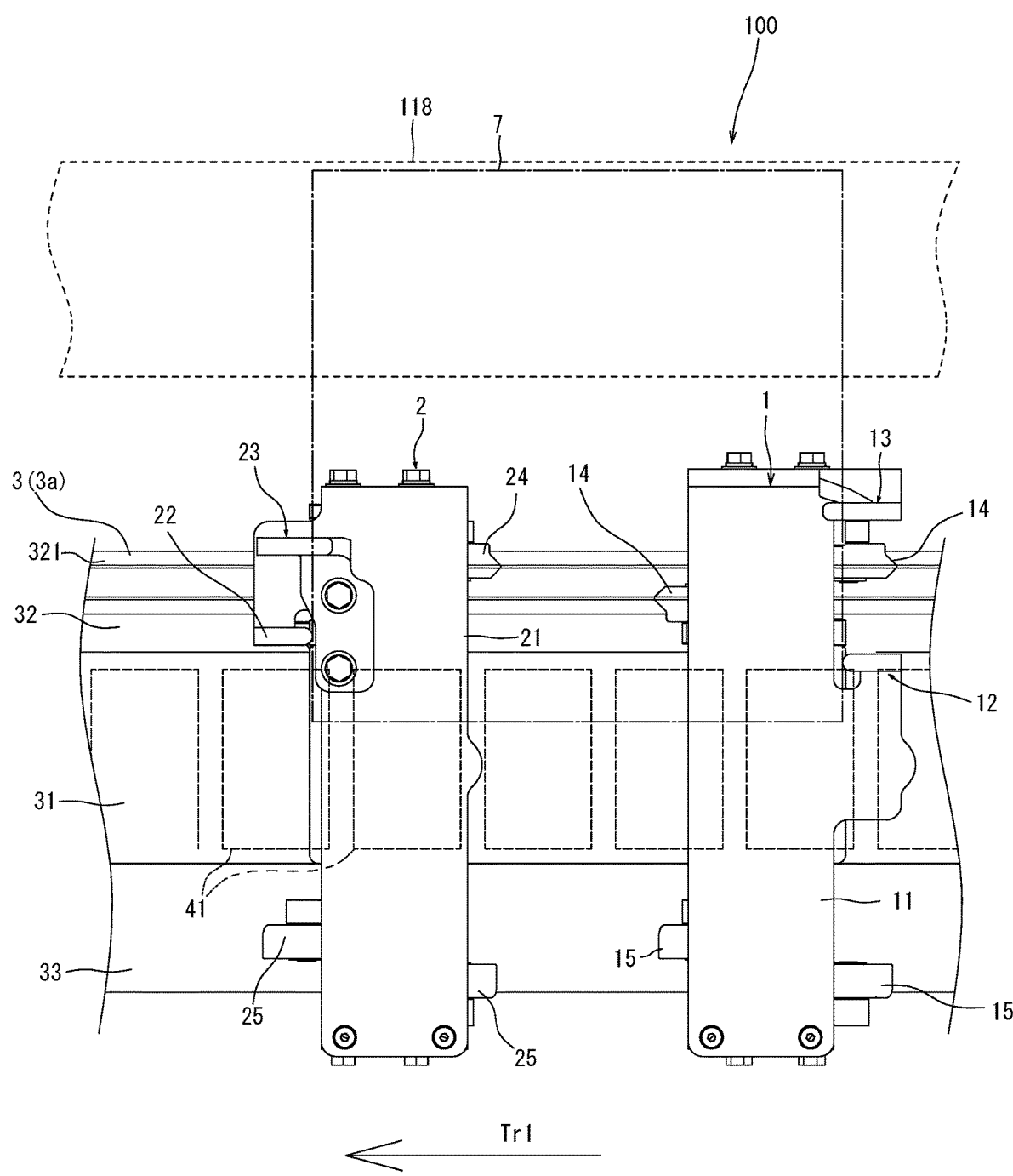
FIG. 5 is a diagram showing the first and second holding shuttles shown in FIG. 3 as seen from outward.
Figure 6:
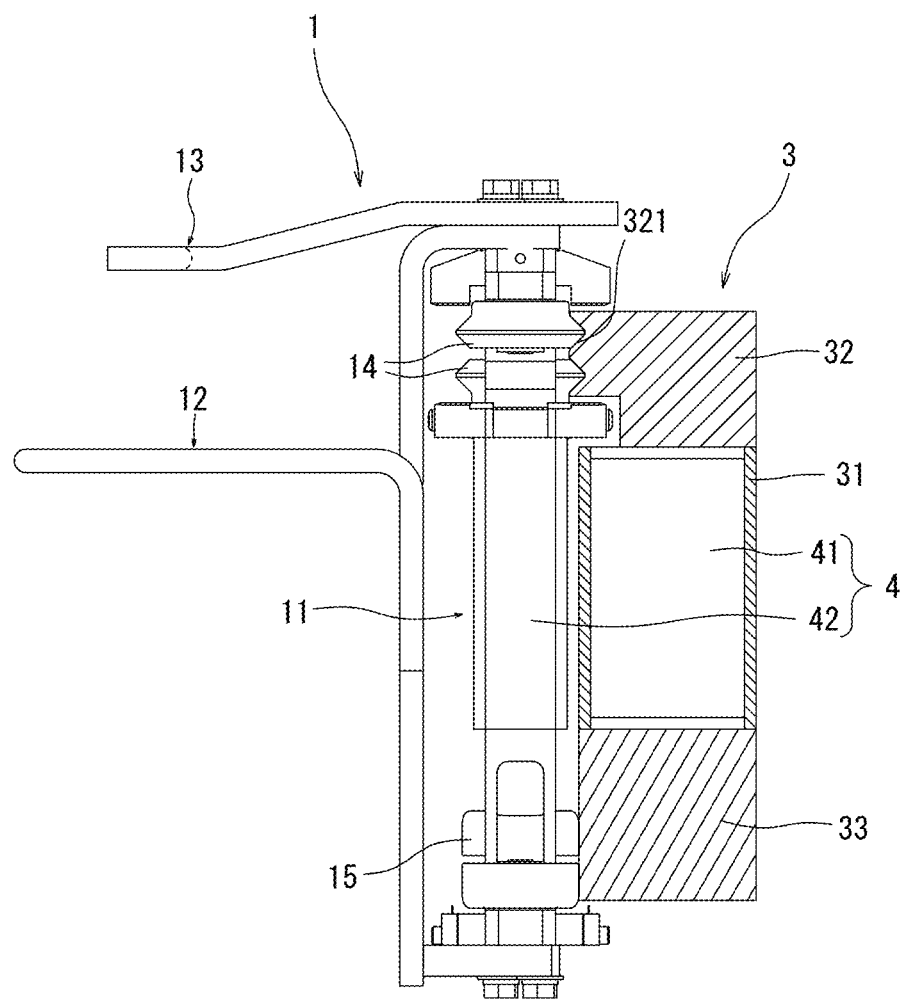
FIG. 6 is a diagram showing the first holding shuttle as seen from upstream in the transport direction.
Figure 7:
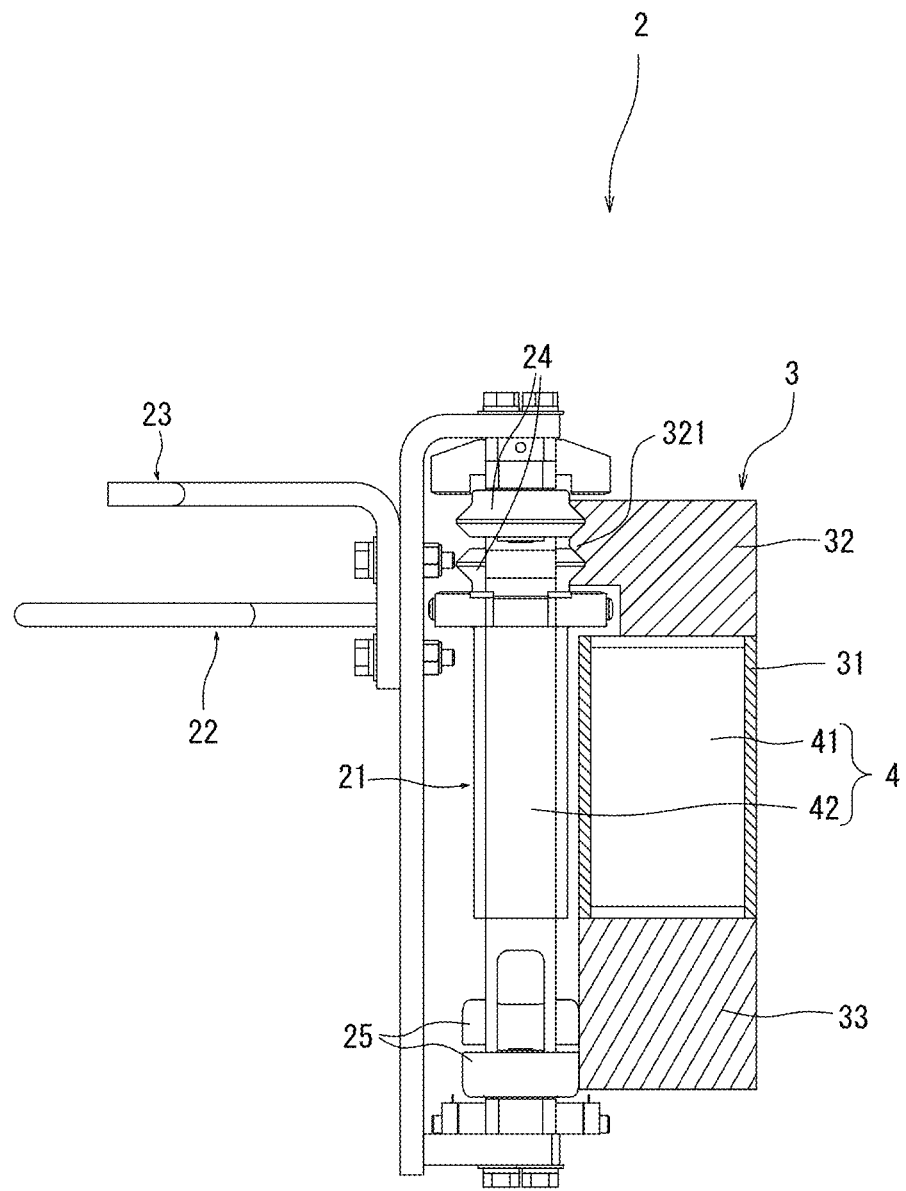
FIG. 7 is a diagram showing the second holding shuttle as seen from upstream in the transport direction.

The main transport mechanism 210 will now be described in detail with reference to the relevant drawings. FIG. 3 is a plan view of a first holding shuttle 1 and a second holding shuttle 2 moving along a straight rail 3a while holding a transport case 7. FIG. 4 is a plan view of a first holding shuttle 1 and a second holding shuttle 2 moving along a curved rail 3b while holding a transport case 7. FIG. 5 shows the first and second holding shuttles 1 and 2 shown in FIG. 3 as seen from outward. FIG. 6 shows the first holding shuttle 1 as seen from upstream in the transport direction Tr1. FIG. 7 shows the second holding shuttle 2 as seen from upstream in the transport direction Tr1. As shown in FIGS. 1 to 7, the main transport mechanism 210 has a first holding shuttle 1, a second holding shuttle 2, a rail 3, and a linear driver 4.

<Rail 3>

The rail 3 guides the movement of the first and second holding shuttles 1 and 2. As shown in FIGS. 1, 3, and 4, in the main transport mechanism 210, the rail 3 has a straight rail 3a and a curved rail 3b. The straight and curved rails 3a and 3b differ in whether they are straight or curved and are otherwise configured basically similarly.

Accordingly, in the following description, unless distinction is necessary, the straight and curved rails 3a and 3b will be described collectively as the rail 3. As shown in FIGS. 3 to 7 etc., the rail 3 has a main rail part 31, a grooved rail part 32, and a flat rail part 33.

The main rail part 31 is in the form of a pipe with a rectangular cross section on a plane perpendicular to the transport direction Tr1. The longer-side direction of the cross section of the main rail part 31 is aligned with the up-down direction. Inside the main rail part 31, coils 41 of the linear driver 4 are arranged. The main rail part 31 is formed of a material through which a magnetic force from the coils 41 permeates when these are magnetically excited by being supplied with electric current. Examples of such materials include some types of stainless steel, aluminum, and alloys of aluminum, with no limitation intended.

The grooved rail part 32 is fixed to a top of the main rail part 31. The main rail part 31 and the grooved rail part 32 can be fixed together by welding, screw-fastening, or the like, with no limitation intended. The main rail part 31 and the grooved rail part 32 may be formed unitarily. The grooved rail part 32 has grooves 321 with a recessed shape recessed from its outer face in a direction intersecting the transport direction Tr1. The grooves 321 are formed all around the rail 3. The grooved rail part 32 has two grooves 321. The two grooves 321 are arranged one above the other. The two grooves 321 accommodate upper rollers 14, which will be described later, of the first holding shuttle 1 and upper rollers 24, which will be described later, of the second holding shuttle 2. The upper rollers 14 and 24 move along the grooves 321.

The flat rail part 33 is fixed to a bottom of the main rail part 31. The main rail part 31 and the flat rail part 33 can be fixed together by welding, screw-fastening, or the like, with no limitation intended. The main rail part 31 and the flat rail part 33 may be formed unitarily. The flat rail part 33 is so shaped that the outer side of its cross section on a plane intersecting the transport direction Tr1 is aligned with the vertical line (see FIGS. 6 and 7 etc.). With the outer face of the flat rail part 33, lower rollers 15, which will be described later, of the first holding shuttle 1 and lower rollers 25, which will be described later, of the second holding shuttle 2 make contact. The lower rollers 15 and 25 rotate while in contact with the outer face of the flat rail part 33.

Straight rails 3a are arranged inward of the first and second straight parts 111 and 112 of the main transport passage 110. Curved rails 3b are arranged inward of the first and second curved parts 113 and 114 of the main transport passage 110. The straight rail 3a in the first straight part 111, the curved rail 3b in the first curved part 113, the straight rail 3a in the second straight part 112, and the curved rail 3b in the second curved part 114 are coupled together and, further, the curved rail 3b in the second curved part 114 is connected to the rail 3a in the first straight part 111, so that these are arranged in a loop form.

<First Holding Shuttle 1>

The first holding shuttle 1 is arranged on the outer face of the rail 3, and is movable along the rail 3. As shown in FIGS. 3 to 6, the first holding shuttle 1 has a body 11, a first face-pushing arm 12, a first clawed arm 13, upper rollers 14, and lower rollers 15.

In the body 11, a magnet 42, which will be described later, of the linear driver 4 is arranged. The body 11 is arranged outward of the rail 3, opposite the rail 3. The first face-pushing arm 12 protrudes outward from the body 11. With the first holding shuttle 1 attached to the rail 3, the first face-pushing arm 12 forms a predetermined angle with (here, is orthogonal to) the transport direction Tr1.

As shown in FIGS. 3, 5, and 6, the first face-pushing arm 12 protrudes outward from the body 11. The first face-pushing arm 12 makes surface contact with, and pushes, the rear-side face of the transport case 7 in the transport direction Tr1. At least the part of the first face-pushing arm 12 that makes contact with the transport case 7 may be fitted with a non-slip member.

The first clawed arm 13 protrudes from the body 11 in the same direction as the first face-pushing arm 12. As shown in FIGS. 5 and 6, the first clawed arm 13 is arranged above the first face-pushing arm 12, with an interval in between. The first clawed arm 13 has a first claw 16. The first claw 16 protrudes from the outward tip end of the first clawed arm 13 frontward in the transport direction Tr1.

The first holding shuttle 1 has two upper rollers 14 that are rotatably supported in an upper part of it. The two upper rollers 14 are away from each other in the transport direction, and are arranged at different positions in the up-down direction. The outer edges of the upper rollers 14 in the radial direction fit in the grooves 321 in the grooved rail part 32.

The upper rollers 14 rotate while being fitted in the grooves 321. Thus, as the first holding shuttle 1 moves along the rail 3, the first holding shuttle 1 is prevented from being displaced in the up-down direction. That is, the first holding shuttle 1 moves exactly along the rail 3.

The first holding shuttle 1 has two lower rollers 15 that are rotatably supported in a lower part of it. The two lower rollers 15 are away from each other in the transport direction, and are arranged at different positions in the up-down direction. The lower rollers 15 are in a cylindrical shape, and their circumferential faces make contact with the outer face of the flat rail part 33.

The first holding shuttle 1 is, by the magnetic force of the magnet 42 arranged in it, attracted onto the outer face of the rail 3. The rail 3 may be provided with an attracting member formed of a material, such as iron, that attracts a magnet, or attraction may be achieved by the magnetic force between an iron core provided in a coil 41 and the magnet 42. The first holding shuttle 1 may be attached to the rail 3 such that it is movable along the rail 3 but, with a hook or the like, does not easily come off the rail 3.

The first holding shuttle 1 is attached to the rail 3 so as to be movable along it while keeping a predetermined distance from it with the upper and lower rollers 14 and 15.

<Second Holding Shuttle 2>

The second holding shuttle 2 is arranged on the outer face of the rail 3, and is movable along the rail 3. As shown in FIGS. 3, 5, and 7, the second holding shuttle 2 has a body 21, a second face-pushing arm 22, a second clawed arm 23, upper rollers 24, and lower rollers 25.

In the body 21, a magnet 42, which will be described later, of the linear driver 4 is arranged. The body 21 is arranged outward of the rail 3, opposite the rail 3. The second face-pushing arm 22 protrudes outward from the body 21. With the second holding shuttle 2 attached to the rail 3, the second face-pushing arm 22 forms a predetermined angle with (here, is orthogonal to) the transport direction Tr1.

As shown in FIGS. 3, 5, and 7, the second face-pushing arm 22 protrudes outward from the body 21. The second face-pushing arm 22 makes surface contact with, and pushes, the front-side face of the transport case 7 in the transport direction Tr1. At least the part of the second face-pushing arm 22 that makes contact with the transport case 7 may be fitted with a non-slip member.

The second clawed arm 23 protrudes from the body 11 in the same direction as the second face-pushing arm 22. As shown in FIGS. 5 and 7, the second clawed arm 23 is arranged above the second face-pushing arm 22, with an interval in between. The second clawed arm 23 has a second claw 26. The second claw 26 protrudes from the outward tip end of the second clawed arm 23 rearward in the transport direction Tr1.

The second holding shuttle 2 has two upper rollers 24 that are rotatably supported in an upper part of it. The two upper rollers 24 are away from each other in the transport direction, and are arranged at different positions in the up-down direction. The outer edges of the upper rollers 24 in the radial direction fit in the grooves 321 in the grooved rail part 32.

The upper rollers 24 rotate while being fitted in the grooves 321. Thus, as the second holding shuttle 2 moves along the rail 3, the second holding shuttle 2 is prevented from being displaced in the up-down direction. That is, the second holding shuttle 2 moves exactly along the rail 3.

The second holding shuttle 2 has two lower rollers 25 that are rotatably supported in a lower part of it. The two lower rollers 25 are away from each other in the transport direction, and are arranged at different positions in the up-down direction. The lower rollers 25 are in a cylindrical shape, and their circumferential faces make contact with the outer face of the flat rail part 33.

The second holding shuttle 2 is, by the magnetic force of the magnet 42 arranged in it, attracted onto the outer face of the rail 3. The rail 3 may be provided with an attracting member formed of a material, such as iron, that attracts a magnet, or attraction may be achieved by the magnetic force between an iron core provided in a coil 41 and the magnet 42. The second holding shuttle 2 may be attached to the rail 3 such that it is movable along the rail 3 but, with a hook or the like, does not easily come off the rail 3.

The second holding shuttle 2 is attached to the rail 3 so as to be movable along it while keeping a predetermined distance from it with the upper and lower rollers 24 and 25.

<Linear Driver 4>

The linear driver 4 will now be described with reference to the relevant drawings. The linear driver 4 employs a linear motor mechanism. The linear driver 4 can drive the first and second holding shuttles 1 and 2 independently.

The linear driver 4 includes a plurality of coils 41, magnets 42, and a linear motor driver 43 (see FIG. 2). The plurality of coils 41 are arranged inside the rail 3, along the rail 3.

The magnets 42 are permanent magnets, and are arranged inside the bodies 11 and 21 of the first and second holding shuttles 1 and 2. The magnet 42 arranged in the body 11 of the first holding shuttle 1 and the plurality of coils 41 arranged inside the rail 3 constitute a linear motor. Likewise, the magnet 42 arranged in the body 21 of the second holding shuttle 2 and the plurality of coils 41 arranged inside the rail 3 constitute a linear motor. Thus, the main transport mechanism 210 is a linear motor transport mechanism that employs a linear motor.

The linear motor driver 43 is connected to the controller 400. The linear motor driver 43 is connected also to an unillustrated power source circuit. According to instructions from the controller 400, the linear motor driver 43 supplies electric power from the power source circuit to the specified coils 41. The linear motor driver 43 may include circuits such as a power supply circuit that adjusts the voltage and current supplied to each coil 41.

By switching the coils 41 to which electric current is supplied, the coils 41 and the magnets 42 act as a linear motor, and the first and second holding shuttles 1 and 2 move along the rail 3. The controller 400 controls the movement of the first and second holding shuttles 1 and 2 independently.

The main transport mechanism 210 includes, in addition to the linear driver 4, a main transport conveyor 211, which is arranged at the junction point 115. The main transport conveyor 211 is arranged to assist the movement of the transport case 7 from the joining transport passage 120.

The main transport mechanism 210 includes a monitor 212, which is connected to the controller 400. The monitor 212 monitors the first and second holding shuttles 1 and 2 passing by a regulation standby position Sp1 upstream of the main transport conveyor 211 in the transport direction Tr1. The monitor 212 monitors the passage of the first and second holding shuttles 1 and 2 and whether they are holding a transport case 7. It then transmits the results as monitoring information to the controller 400.

<Joining Transport Mechanism 220 and Branching Transport Mechanism 230>

The joining transport mechanism 220 includes a joining conveyor 221. The joining conveyor 221 is arranged along the joining transport passage 120. The joining conveyor 221, on top of which a transport case 7 can be placed, transports the transport case 7 placed on top of it in the transport direction Tr1 along the joining transport passage 120. The joining conveyor 221 is controlled by the controller 400 (see FIG. 2). The controller 400 controls the joining conveyor 221, for example, in terms of the starting and stopping of, and speed adjustment for, transport of a transport case 7 by the joining conveyor 221.

The branching transport mechanism 230 includes a branching conveyor 231. The branching conveyor 231 is arranged in the run-up region 117, and is arranged along the branching transport passage 130. The branching conveyor 231, on top of which a transport case 7 can be placed, transports the transport case 7 placed on top of it in the transport direction Tr1 along the branching transport passage 130. The branching conveyor 231 is controlled by the controller 400 (see FIG. 2).

The branching transport mechanism 230 includes a condition sensor 232. The condition sensor 232 is arranged upstream, in the transport direction Tr1, of the run-up region 117 in the second straight part 112 of the main transport passage 110. The condition sensor 232 monitors the transport case 7 that reaches the run-up region 117 to sense the condition of the transport case 7 and transmit it as sensing information to the controller 400 (see FIG. 2). Based on the sensing information, the controller 400 determines whether to feed the transport case 7 to the branching transport passage 130 or to the second curved part 114 of the main transport passage 110. The branching of the transport of a transport case 7 will be described in detail later.

<Feeding Device 300>

Figure 8:
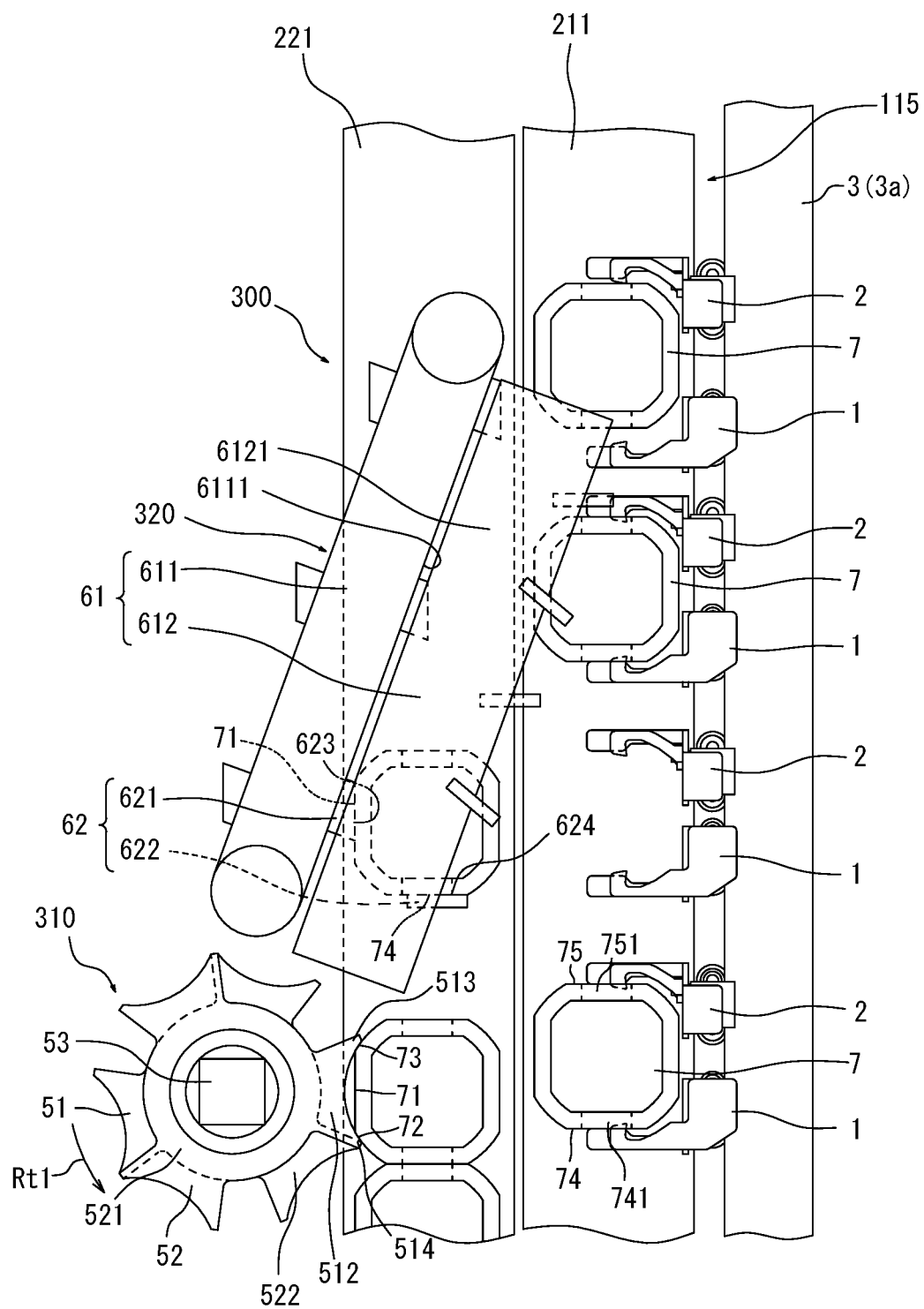
FIG. 8 is an enlarged plan view of a feeding device.
Figure 9:
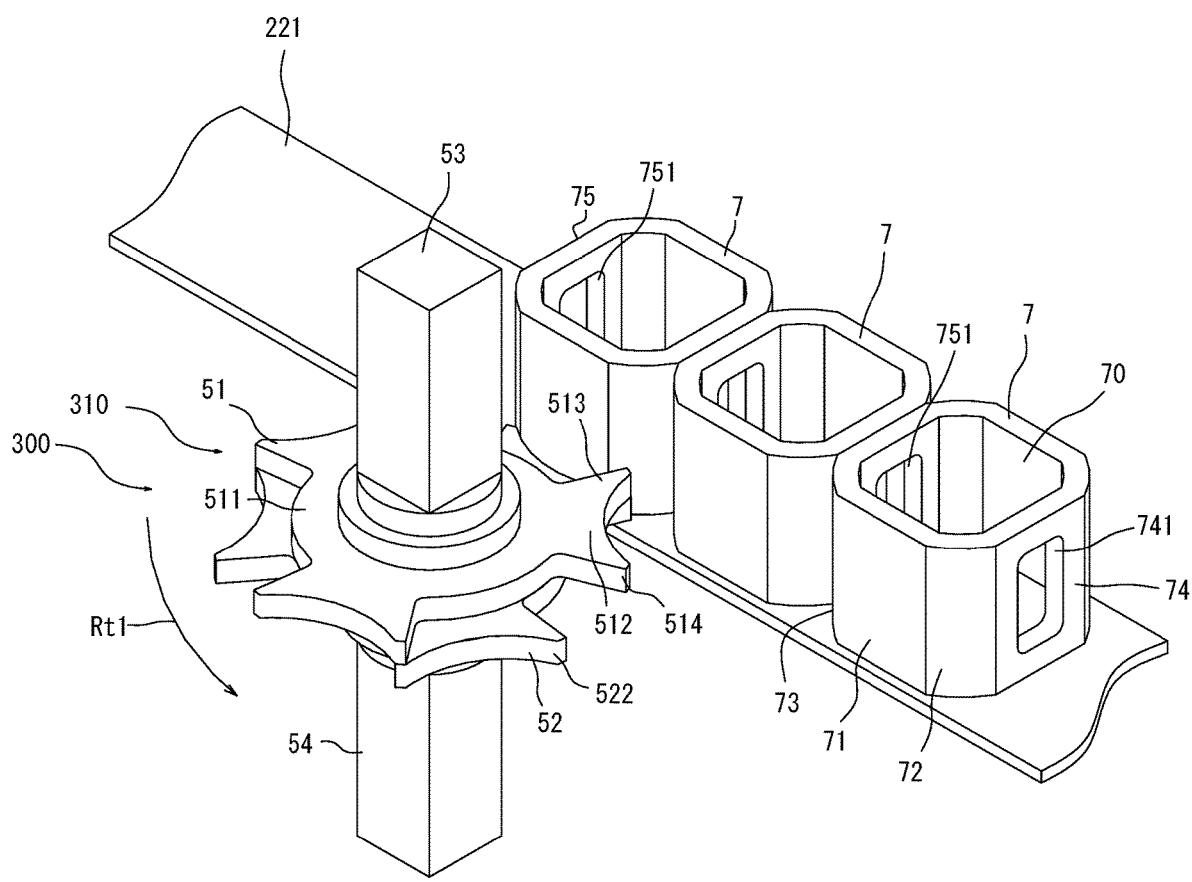
FIG. 9 is a perspective view of a discharger in the feeding device.

Next, the feeding device 300 will be described in detail with reference to the relevant drawings. FIG. 8 is an enlarged plan view of the feeding device 300. FIG. 9 is a perspective view of a discharger 310 provided in the feeding device 300.

As shown in FIG. 1 etc., the feeding device 300 connects to the downstream end of the joining transport passage 120 in the transport direction. The feeding device 300 feeds a transport case 7 conveyed in the joining transport passage 120 to the junction point 115 and transports it to the main transport passage 110. The feeding device 300 has a discharger 310 and a feeder 320.

<Discharger 310>

When a transport case 7 is transported downstream in the transport direction Tr1 along the joining transport passage 120, the discharger 310 keeps it momentarily at rest at the downstream end of the joining transport passage 120 and then feeds out the transport case 7 at rest with such timing that it does not interfere with a transport case 7 transported along the main transport passage 110. Here, feeding out denotes an action of pushing the transport case 7 forth in the transport direction Tr1. The discharger 310 includes a first star wheel 51, a second star wheel 52, a first driver 53, and a second driver 54.

<First and Second Star wheels 51 and 52>

In the discharger 310, the first and second star wheels 51 and 52 are arranged above each other such that their center axes coincide and that they are independently rotatable. As shown in FIG. 9, the first star wheel 51 is arranged above the second star wheel 52. The first and second star wheels 51 and 52 are similarly configured. Accordingly, the first star wheel 51 will be described below as their representative. For the second star wheel 52, how it corresponds to the first star wheel 51 will be described.

As shown in FIG. 9, the first star wheel 51 has a body 511 and three engagement projections 512. The body 511 is in the form of a disk as seen in a plan view. While the body 511 may be in any other form than a disk, it preferably is in the form of a disk to permit smooth rotation of the first star wheel 51.

The three engagement projections 512 extend from the outer edge of the body 511 in the radial direction outward in the radial direction. The three engagement projections 512 are arranged at equal intervals in the circumferential direction. The three engagement projections 512 have the same shape. The engagement projections 512 engage with a side face of a transport case 7 so as to keep momentarily at rest the transport case 7 transported to the downstream end of the joining transport passage 120.

The transport case 7 will now be described. The transport case 7 is transported in the main transport passage 110, the joining transport passage 120, the branching transport passage 130, and the curved transport passage 140. The transport case 7 is a box member with an opening 70 at the top. The transport case 7 has an outer face 71, a rear-side corner part 72, a front-side corner part 73, a rear face 74, and a front face 75.

The outer face 71 is a flat face that points outward, and is a face that points outward in a direction intersecting the transport direction Tr1. The rear face 74 is the rear-side face in the transport direction Tr1. The front face 75 is a front-side face in the transport direction Tr1.

The rear-side corner part 72 is arranged between the outer face 71 and the rear face 74. The front-side corner part 73 is arranged between outer face 71 and the front face 75. The rear face 74 has a recessed part 741 in the form of a through hole. The front face 75 has a recessed part 751 in the form of a through hole. The recessed parts 741 and 751 may be in any other form than a through hole.

The engagement projections 512 engage with the rear-side and front-side corner parts 72 and 73 of the transport case 7. Owing to the transport case 7 having the corner parts 72 and 73, the engagement projections 512 can engage with the transport case 7 smoothly and reliably.

As shown in FIGS. 8, 9, etc., each engagement projection 512 has a locking projection 513 and a pushing projection 514. The first star wheel 51 rotates in a rotation direction Rt1 that is counter-clockwise direction as seen in a plan view. The locking projection 513 protrudes outward in the radial direction from the front end, in the rotation direction Rt1, of the outer edge, in the radial direction, of the engagement projection 512. The pushing projection 514 protrudes outward in the radial direction from the rear end, in the rotation direction Rt1, of the outer edge, in the radial direction, of the engagement projection 512.

In the discharger 310, an outward end part, in the radial direction, of the engagement projection 512 of the first star wheel 51 is arranged inside the joining transport passage 120 so as to engage with the front-side and rear-side corner parts 73 and 72 of the transport case 7 transported along the joining transport passage 120. More specifically, the locking and pushing projections 513 and 514 of the engagement projection 512 of the first star wheel make contact with the front-side and rear-side corner parts 73 and 72 of the transport case 7.

While the transport case 7 is transported by the joining conveyor 221, the locking projection 513 makes contact with the front-side corner part 73. As the transport case 7 is transported, the locking projection 513 is pushed by the front-side corner part 73. Thus the first star wheel 51 rotates in the rotation direction Rt1. When the transport case 7 has moved to a joining standby position Jp1 (see FIG. 1) in the joining transport passage 120, the locking projection 513 of the first star wheel 51 holds the front-side corner part 73 of the transport case 7 and restrains the transport case 7 from moving in the transport direction. Thus the transport case 7 is kept momentarily at rest at the joining standby position Jp1.

While the transport case 7 is kept momentarily at rest at the joining standby position Jp1, the pushing projection 514 makes contact with the rear-side corner part 72. From this state, as the first star wheel 51 rotates in the rotation direction Rt1, the pushing projection 514 pushes the rear-side corner part 72 downward in the transport direction Tr1. Thus the transport case 7 is fed out downstream in the transport direction Tr1.

The first star wheel 51 is configured as described above. The second star wheel 52 has a body 521 and engagement projections 522. The body 521 corresponds to the body 511 of the first star wheel 51, and the engagement projections 522 correspond to the engagement projections 512. Each engagement projection 522 has a locking projection 523 and a pushing projection 524, which correspond to the locking projection 513 and the pushing projection 514 of an engagement projection 512.

The first and second star wheels 51 and 52 are arranged above each other such that their center axes coincide as seen in a plan view, the engagement projections 512 of the first star wheel 51 and the engagement projections 522 of the engagement projection 512 are arranged such that the former are displaced from the latter in the circumferential direction.

<First Driver 53 and Second Driver 54>

The first and second drivers 53 and 54 are connected to the controller 400, and operate according to instructions from the controller 400. The first and second drivers 53 and 54 are similarly configured.

The first driver 53 is a driving source for rotating the first star wheel 51. The first driver 53 is, for example, configured to include an electric motor. This is not meant as any limitation. Any configuration that can rotate the first and second star wheels 51 and 52 may be adopted. As shown in FIG. 9, in the discharger 310, the first driver 53 is arranged above the first star wheel 51.

The second driver 54 is a driving source for rotating the second star wheel 52. The second driver 54 may, like the first driver 53, include an electric motor, or may be configured to rotate the second star wheel 52 any otherwise. As shown in FIG. 9, in the discharger 310, the second driver 54 is arranged below the second star wheel 52.

The first and second drivers 53 and 54 each have an output shaft, though not illustrated, The first and second drivers 53 and 54 are arranged such that the centers of their output shafts coincide. That is, the first driver 53, the first star wheel 51, the second star wheel 52, and the second driver 54 are arranged in this order from top such that their centers lie on a straight line.

When the first star wheel 51 keeps the transport case 7 momentarily at rest, the first and second drivers 53 and 54 may act as a brake to restrict the rotation of the first and second star wheels 51 and 52 respectively. Instead, separate brake mechanisms may be provided to keep at rest the first and second star wheels 51 and 52 independently.

In the embodiment, the first and second drivers 53 and 54 rotate the first and second star wheels 51 and 52 respectively. This is not meant as any limitation. For example, in a configuration where the first and second star wheels 51 and 52 can be driven synchronously with a force transmission mechanism using a gear, belt, chain, or the like, driving sources may be consolidated into one. The discharger 310 is configured as described above. The transport case 7 fed out by the discharger 310 is fed to the main transport passage 110 by the feeder 320.

<Feeder 320>

Figure 10:
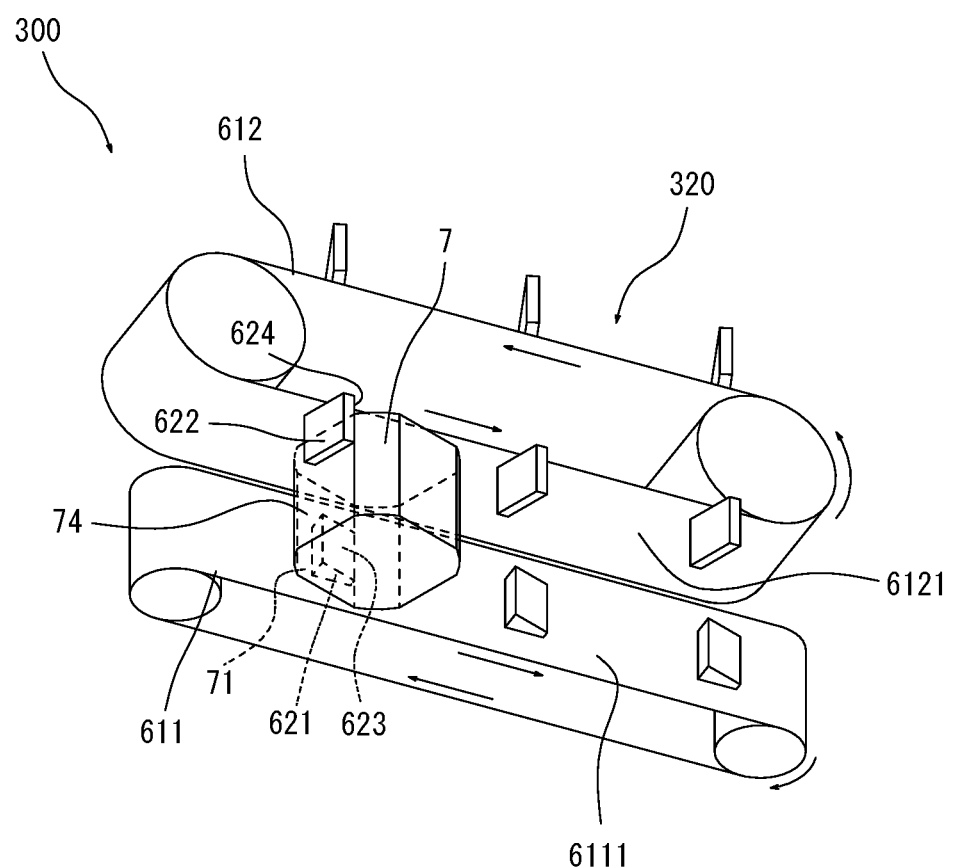
FIG. 10 is a perspective view of a feeder provided in the feeding device as seen from below.

Next, the feeder 320 will be described in detail with reference to the relevant drawings. FIG. 10 is a perspective view of the feeder 320 provided in the feeding device 300 as seen from below. In FIG. 10, the main transport conveyor 211 and the joining conveyor 221 are omitted from illustration. As shown in FIG. 10, the feeder 320 includes a feed-out mover 61 and a contact rest 62. The feed-out mover 61 includes a side mover 611 and a top mover 612. The contact rest 62 includes first rests 621 and second rests 622.

As shown in FIGS. 8 and 10, the side mover 611 is arranged outward of the main transport passage 110. The side mover 611 is, for example, a straight top chain conveyor with a belt surface 6111 arranged vertically upright. The belt surface of the side mover 611 is orthogonal to the top belt surface of the joining conveyor 221. The side mover 611, of which an upstream-side part in the transport direction Tr1 is arranged above the joining transport passage 120, is increasingly close to the main transport passage 110 as it extends downstream. While a belt conveyor is used as the side mover 611 here, this is not meant as any limitation.

The top mover 612 is arranged above the top face of the transport case 7. The top mover 612 is, for example, a straight belt conveyor with belt surfaces 6121 at its top and bottom. The bottom belt surface of the top mover 612 faces the joining conveyor 221 in the up-down direction. The top mover 612, of which an upstream-side part in the transport direction Tr1 overlaps the joining transport passage 120 in the up-down direction, is increasingly close to the main transport passage 110 as it extends downstream. While a belt conveyor is used as the top mover 612 here, this is not meant as any limitation.

The first rests 621 are fixed to the belt surface 6111 of the side mover 611. Each first rest 621 is in the shape of a triangular prism as seen in a plan view. The first rest 621 has a first contact face 623 that, with the first rest 621 fitted to the belt surface 6111, makes contact with the outer face 71 of the transport case 7. The first contact face 623 is a vertical face, and the line normal to it is orthogonal to the transport direction Tr1. That is, the first contact face 623 is inclined relative to the belt surface 6111 of the side mover 611.

On the other hand, to the belt surface 6121 of the top mover 612, the second rests 622 are fixed. Each second rest 622 is in the shape of a rectangular parallelepiped. The second rest 622 has a second contact face 624 that, with the first rest 621 fitted to the belt surface 6121, makes contact with the rear face 74 of the transport case 7. The second contact face 624 is a vertical face, and the line normal to it is parallel to the transport direction Tr1. That is, the line normal to the second contact face 624 is inclined relative to the movement direction of the belt surface 6121 of the top mover 612.

The side and top movers 611 and 612 are both controlled by the controller 400. The controller 400 controls the side and top movers 611 and 612 in terms of, for example, the starting, stopping, and speed adjustment of the operation of the side and top movers 611 and 612.

The transport apparatus A for transported pieces is configured as described above. Next, the operation of the transport apparatus A for transported pieces will be described. First, a description will be given of the operation of the main transport mechanism 210, the joining transport mechanism 220, and the branching transport mechanism 230 in the main transport passage 110.

<Transport Operation>

The first and second holding shuttles 1 and 2 in the main transport mechanism 210 are used to apply to a transport case 7 a force that tends to move it in the transport direction Tr1, and to keep the transport case 7 in stable orientation.

As shown in FIGS. 1, 3 to 5, etc., the first holding shuttle 1 holds the rear face 74 of the transport case 7; the second holding shuttle 2 holds the front face 75 of the transport case 7. When the transport case 7 is transported in the first or second straight part 111 or 112 of the main transport passage 110, the first face-pushing arm 12 of the first holding shuttle 1 makes contact with the rear face 74 of the transport case 7 and the second face-pushing arm 22 of the second holding shuttle 2 makes contact with the front face 75 of the transport case 7. Thus the first and second holding shuttles 1 and 2 hold the transport case 7.

When transporting the transport case 7 in the first or second straight part 111 or 112, the first and second holding shuttles 1 and 2 hold the rear-side and front-side faces of the transport case 7 in the transport direction Tr1 with the first and second face-pushing arms 12 and 22. In this state, the first and second claws 16 and 26 of the first and second clawed arms 13 and 23 are arranged in the recessed parts 741 and 751, respectively, in the transport case 7 (see FIG. 3). Note that, when the transport case 7 is transported along a straight part, the first and second claws 16 and 26 do not engage with the recessed parts 741 and 751 respectively.

When the transport case 7 is transported in the first or second curved part 113 or 114, as shown in FIG. 4, the first claw 16 of the first clawed arm 13 of the first holding shuttle 1 engages with the recessed part 741 in the transport case 7, and the second claw 26 of the second clawed arm 23 of the second holding shuttle 2 engages with the recessed part 751 in the transport case 7.

As shown in FIGS. 1, 3, etc., held by the first and second holding shuttles 1 and 2, the transport case 7 is transported along a straight rail 3a while keeping predetermined orientation. For example, as shown in FIG. 3, of the transport case 7 moving along the straight rail 3a, the outer face 71 points outward in a direction intersecting the transport direction Tr1; the rear and front faces 74 and 75 are orthogonal to the transport direction Tr1. The orientation of the transport case 7 moving along the straight rail 3a while being held by the first and second holding shuttles 1 and 2 will be referred to as the reference orientation Gs (see FIGS. 1, 3, etc.).

When the transport case 7 moves along a curved part, the first and second claws 16 and 26 engage with the recessed parts 741 and 751, and thus part of the centrifugal force is borne by the first and second holding shuttles 1 and 2. Moreover, in the main transport passage 110, the guide 118 is provided outward. Thus the centrifugal force of the transport case 7 is borne also by the guide 118. In this way, the first and second holding shuttles 1 and 2 is prevented from coming off the rail 3 under the centrifugal force of the transport case 7.

When the first and second holding shuttles 1 and 2 transport, while holding, the transport case 7 along a curved part, at least part of the first face-pushing arm 12 stays in contact with the rear face 74 of the transport case 7. Thus, during transport along a curved part, the transport case 7 is transported with its rear face 74 pushed by the first face-pushing arm 12.

<Joining of a Transport Case 7 at the Junction Point 115>

The transport cases 7 that are transported in the joining transport passage 120 are kept momentarily at rest at the joining standby position Jp1 by the discharger 310, and are after that fed out one by one by the discharger 310. A transport case 7 so fed out is moved in the transport direction Tr1 by the force with which it is pushed by the discharger 310 and also by the joining conveyor 221 to be fed to the feeder 320. First the operation of discharger 310 will be described, and then the operation of the feeder 320 will be described.

<Operation of the Discharger 310>

Figure 11:
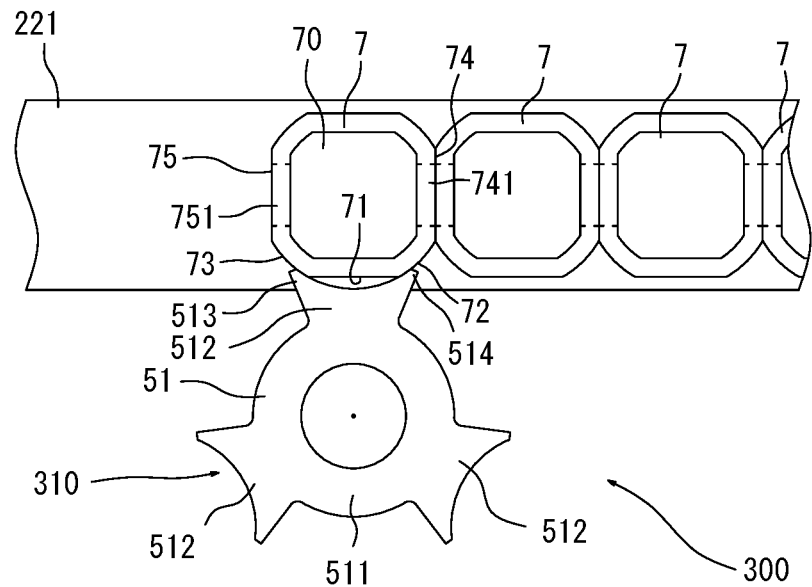
FIG. 11 is a plan view of a first star wheel holding the most downstream transport case in the transport direction at time point T1.
Figure 12:
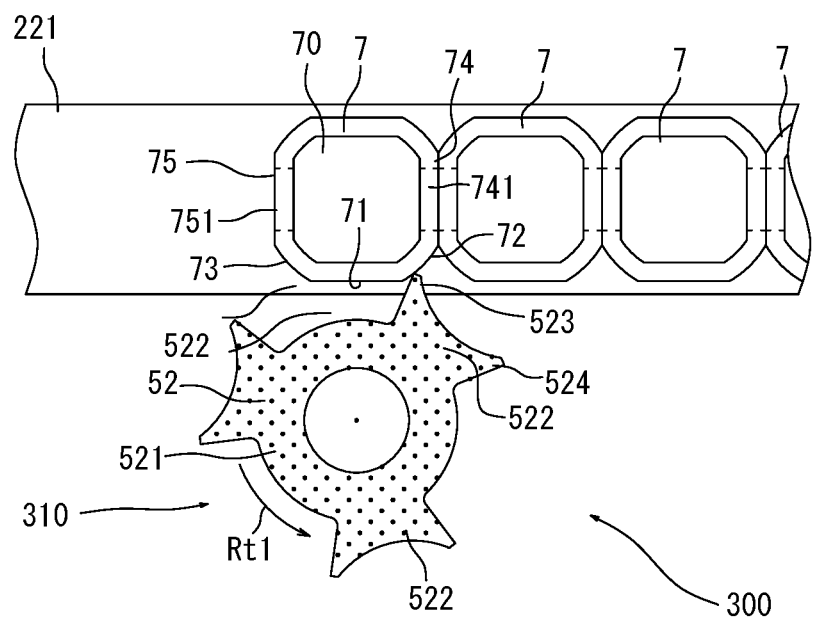
FIG. 12 is a plan view showing the position of the second star wheel at time point T1.
Figure 13:
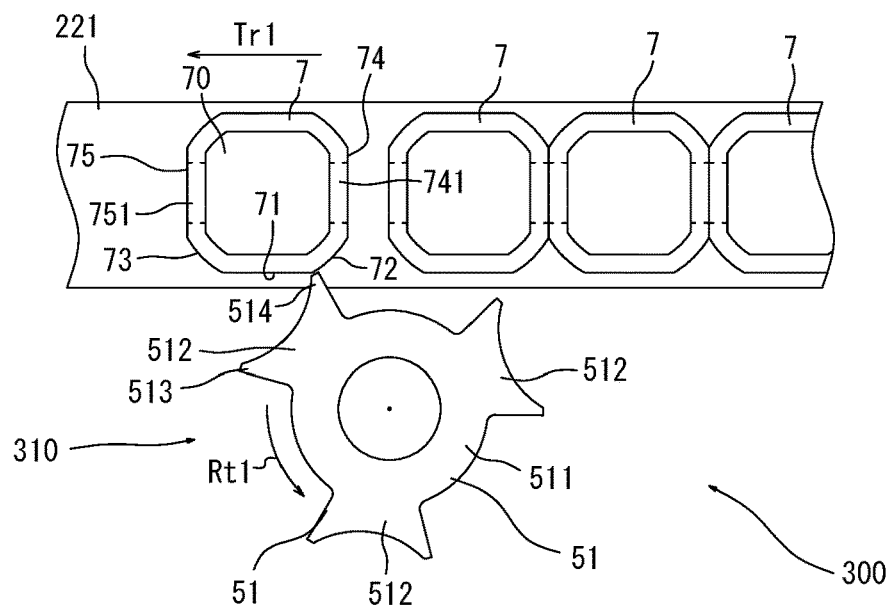
FIG. 13 is a plan view of the first star wheel having fed out a transport case 7 at time point T2.
Figure 14:
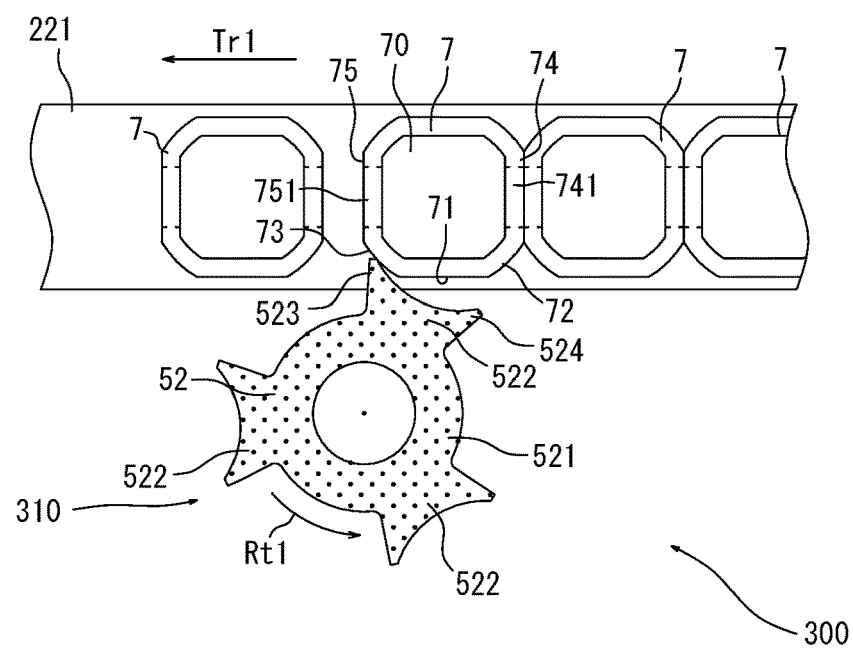
FIG. 14 is a plan view showing the position of a second star wheel at time point T2.

A description will now be given of the feeding-out of a transport case 7 by the discharger 310 mentioned above, with reference to the relevant drawings. FIG. 11 is a plan view of the first star wheel 51 holding the most downstream transport case 7 in the transport direction at time point T1. FIG. 12 is a plan view showing the position of the second star wheel 52 at time point T1. FIG. 13 is a plan view of the first star wheel 51 having fed out the transport case 7 at time point T2. FIG. 14 is a plan view showing the position of the second star wheel 52 at time point T2.

Figure 15:
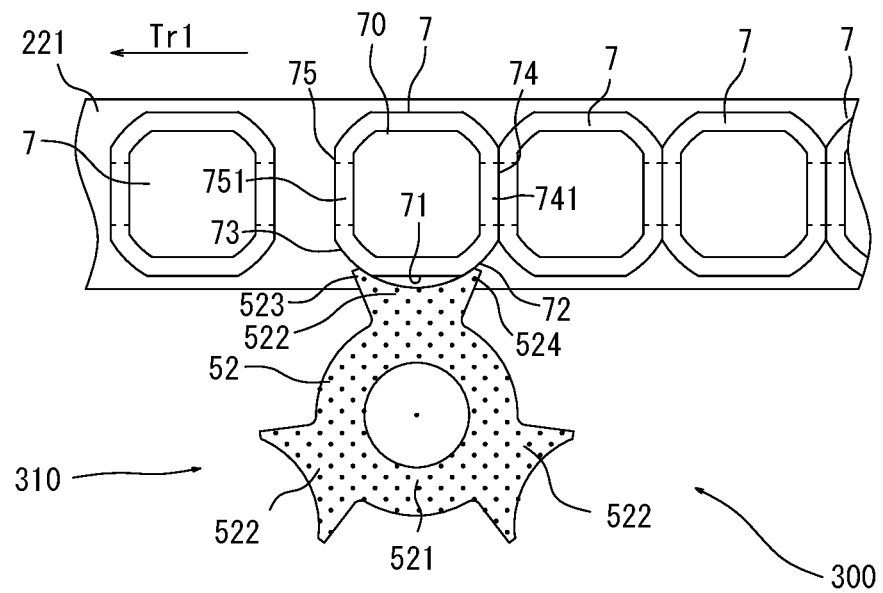
FIG. 15 is a plan view of the second star wheel holding the most downstream transport case in the transport direction at time point T3.
Figure 16:
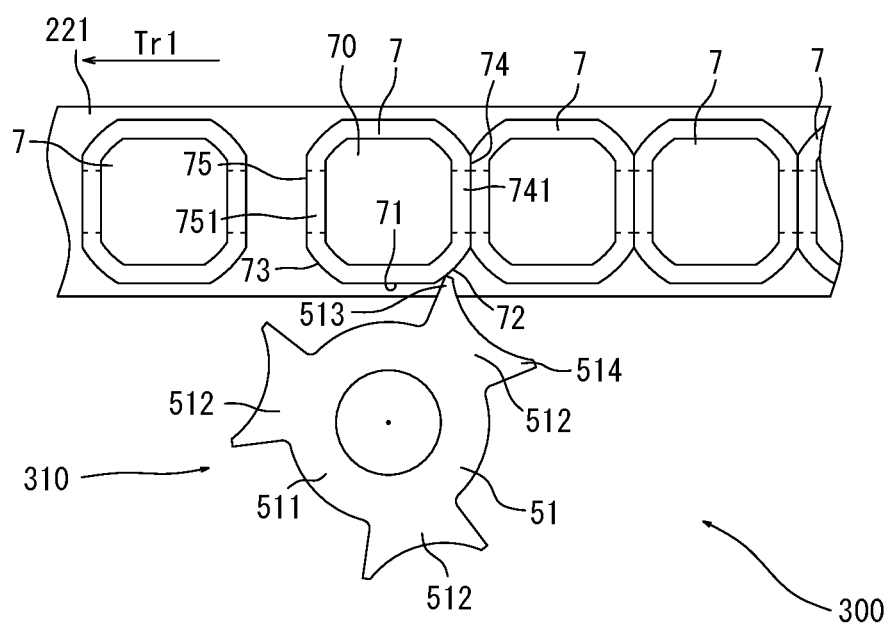
FIG. 16 is a plan view showing the position of the first star wheel at time point T3.

FIG. 15 is a plan view of the second star wheel 52 holding the most downstream transport case 7 in the transport direction at time point T3. FIG. 16 is a plan view showing the position of the first star wheel 51 at time point T3. In FIGS. 11 to 16, the second star wheel 52 is dot-hatched for easy distinction from the first star wheel 51. Moreover, while in FIGS. 11 to 16 the first and second star wheels 51 and 52 are shown separately, in reality they operate in a state horizontally overlapping each other as shown in FIG. 9 etc.

As shown in FIG. 11, at time point T1, the front-side and rear-side corner parts 73 and 72 of the transport case 7 are engaged with the engagement projections 512 of the first star wheel 51. Thus the transport case 7 is kept momentarily at rest at the joining standby position Jp1. At this time, the first driver 53 applies a force to the first star wheel 51 such that the first star wheel 51 restrains movement of the transport case 7. Upstream of the joining standby position Jp1 in the transport direction Tr1, a plurality of transport cases 7 are kept at rest while staying in contact with each other.

On the other hand, at time point T1, with the second star wheel 52 immediately after feeding out the previous transport case 7 and still with the momentum of that feeding-out, the locking projection 523 of its next engagement projection 522 in the rotation direction Rt1 is at rest by making contact with the rear-side corner part 72 of the transport case 7 currently kept momentarily at rest (see FIG. 12). Here, part of the tip end of the locking projection 523 of the second star wheel 52 overlaps the transport case 7 as seen along the transport direction Tr1.

Then, at time point T2, the first driver 53 rotates the first star wheel 51. As a result, the transport case 7 kept momentarily at rest up to then has its rear-side corner part 72 pushed in the transport direction Tr1 by the pushing projection 514. Thus the transport case 7 is fed out in the transport direction Tr1 (see FIG. 13).

When, as the first star wheel 51 rotates, the pushing projection 514 pushes the transport case 7, the transport case 7 is acted on by forces pointing in the transport direction Tr1 and in a direction intersecting the transport direction Tr1; thus, at the junction point 115, the transport case 7 is moved in the transport direction Tr1 while being guided by the guide 118 arranged between the joining transport passage 120 and the main transport passage 110.

The transport case 7 pushed in the transport direction Tr1 by the pushing projection 514 moves, under force with which it is pushed by the pushing projection 514, in the transport direction, and is transported in the transport direction Tr1 by the joining conveyor 221. By being transported by the joining conveyor 221, the transport case 7 is fed to the feeder 320 at a predefined speed.

On the other hand, at the same time point T2, the locking projection 523 of the second star wheel 52 is pushed by the front-side corner part 73, in the transport direction, of the transport case 7 transported to the joining standby position Jp1. Thus the second star wheel 52 rotates in the rotation direction Rt1 (see FIG. 14). Here, the second driver 54 may detect the rotation of the second star wheel 52 and gives it a rotative force. Here, the second driver 54 may give the second star wheel 52 the rotative force for a predetermined length of time, or until the transport case 7 with which it is in contact reaches the joining standby position Jp1.

As shown in FIG. 15, at time point T3, the next transport case 7 reaches the joining standby position Jp1. At this time, the engagement projection 522 of the second star wheel 52 engages with the front-side and rear-side corner parts 73 and 72 of the transport case 7. In this state, the second driver 54 keeps the second star wheel 52 in a fixed position. Thus the new transport case 7 is kept momentarily at rest at the joining standby position Jp1.

On the other hand, at the same time point T3, the locking projection 513 of the engagement projection 512 of the first star wheel 51 comes to rest by making contact with the rear-side corner part 72, in the transport direction Tr1, of the transport case 7 kept momentarily at rest at the joining standby position Jp1 (see FIG. 16). Through repetition of the states shown in FIGS. 11 to 16 and described above, each transport case 7 transported in the joining transport passage 120 is first kept momentarily at rest at the joining standby position Jp1 and is then fed out with the timing determined by the controller 400.

The discharger 310 has the first and second star wheels 51 and 52 arranged such that their center axes coincide. As one star wheel rotates, it feeds out the transport case 7 kept momentarily at rest at the joining standby position Jp1. Simultaneously the other star wheel keeps momentarily at rest the next transport case 7 transported to the joining standby position Jp1. In this way, in the discharger 310, the first and second star wheels 51 and 52 alternately keep momentarily at rest and feed out one transport case 7 after another with no pause. That is, operating the discharger 310 permits transport cases 7 to be fed out one after another with predetermined timing.

Likewise, at the same time that one star wheel feeds out a transport case 7 from the joining standby position Jp1, the other star wheel keeps the next transported transport case 7 momentarily at rest at the joining standby position Jp1.

Owing to the first and second star wheels 51 and 52 operating alternately, the number of engagement projections 512 in the first star wheel 51 and the number of engagement projections 522 in the second star wheel 52 can be reduced (here, to three each). This permits the first and second star wheels 51 and 52 to be made compact and lightweight. This helps enhance the response of the first star wheel 51 to the driving force from the first driver 53 and the response of the second star wheel 52 to the driving force from the second driver 54. This helps suppress delays in the response of the first and second star wheels 51 and 52, and makes accurate feeding-out possible.

<Operation of the Feeder 320>

The transport case 7 is fed out from the discharger 310 while maintaining the reference orientation Gs (see FIG. 1,3). The transport case 7 so fed out, while still maintaining the reference orientation Gs, is conveyed by the joining conveyor 221.

The feeder 320 receives the transport case 7 in the reference orientation Gs. The side and top movers 611 and 612 are controlled synchronously by the controller 400. The synchronism here refers to, for example, the movement speeds of the belt surfaces 6111 and 6121 of the side and top movers 611 and 612 being equal, with no limitation intended.

The controller 400 also adjusts movement timing such that the first and second rests 621 and 622 move while keeping a predetermined position relative to each other. More specifically, with the first contact face 623 of the first rest 621 orthogonal to the second contact face 624 of the second rest 622, the first and second rests 621 and 622 move while keeping a fixed distance relative to each other.

The transport case 7 has its outer face 71 supported on the first contact face 623 of the first rest 621 and its rear face 74 supported on the second contact face 624 of the second rest 622. Thus the transport case 7 is kept in the reference orientation Gs.

At the junction point 115, the transport case 7 fed out from the discharger 310 is moved in the transport direction Tr1 mainly by the joining conveyor 221. By the first rest 621 fitted to the side mover 611, the transport case 7 moving in the transport direction Tr1 while maintaining the reference orientation Gs is pushed toward the main transport passage 110. The second rest 622 fitted to the top mover 612 pushes the rear face 74 of the transport case 7 in the transport direction Tr1, and thereby, while assisting the transport of the transport case 7 by the joining conveyor 221, helps maintain the reference orientation Gs. Thus, by the feeder 320, the transport case 7 is moved, while maintaining the reference orientation Gs, in a direction inclined relative to the transport direction Tr1 in the first straight part 111 to be fed to the main transport passage 110.

At the junction point 115, the main transport conveyor 211 is arranged adjacent to, and parallel to, the joining conveyor 221. In the feeder 320, as the transport case 7 moves in the transport direction Tr1, it moves from on top of the joining conveyor 221 to on top of the main transport conveyor 211. The controller 400 controls such that the transport speeds of the joining conveyor 221 and the main transport conveyor 211 are equal. This helps suppress irregular orientation of the transport case 7. This is not meant as any limitation. Irregular orientation of the transport case 7 may be suppressed by adjusting the transport speeds of the joining conveyor 221 and the main transport conveyor 211.

In the embodiment, the transport of the transport case 7 in the transport direction Tr1 at the junction point 115 is handled by the joining conveyor 221 and the main transport conveyor 211. This is not meant as any limitation. For example, in a case where the transport case 7 can move to the transport passage 100 smoothly, the main transport conveyor 211 may be omitted. Or, instead of the main transport conveyor 211, an array of rollers that permits smooth movement of the transport case 7 may be arranged. In a case where the transport case 7 can be moved up to the main transport passage 110 by the discharger 310 and the feeder 320, the joining conveyor 221 may extend just to reach the joining standby position Jp1. Or, instead of the joining conveyor 221 at the junction point 115, an array of rollers that permits smooth movement of the transport case 7 may be arranged.

The controller 400 is connected to the first and second drivers 53 and 54 in the discharger 310 and to the side and top movers 611 and 612 in the feeder 320, and control them synchronously. First the controller 400 controls the first and second drivers 53 and 54 to rotate the first and second star wheels 51 and 52 alternately. As a result, one transport case 7 after another is pulled out by the first and second star wheels 51 and 52 with predetermined timing.

Then the controller 400 controls the side and top movers 611 and 612 synchronously with the first and second drivers 53 and 54 so as to bring the first and second rests 621 and 622 into contact with the outer face 71 and the rear face 74, respectively, of the transport case 7 that has reached the feeder 320. In this way, the transport case 7 fed out from the discharger 310 can be fed to the main transport passage 110 without delay.

The transport case 7 that joins the main transport passage 110 at the junction point 115 has its rear and front faces 74 and 75 held by the first and second holding shuttles 1 and 2 in the main transport mechanism 210. In the main transport mechanism 210, the first and second holding shuttles 1 and 2 move along the rail 3, and circulates in the transport direction in the main transport passage 110.

Of the transport cases 7 each held by the first and second holding shuttles 1 and 2, some are fed, at the branch point 116, to the branching transport passage 130 and others return via the second curved part 114 to the first straight part 111, that is, to the regulation standby position Sp1. Some first and second holding shuttles 1 and 2 move, while holding a transport case 7, to the regulation standby position Sp1. At the junction point 115, any first and second holding shuttles 1 and 2 holding no transport case 7 can hold a transport case 7 that are fed out from the feeding device 300.

Accordingly, based on the monitoring information from the monitor 212, the controller 400 checks whether particular first and second holding shuttles 1 and 2 are holding a transport case 7. If the first and second holding shuttles 1 and 2 are found to be holding no transport case 7, the controller 400 lets them pass by the regulation standby position Sp1. At the junction point 115, the controller 400 controls the first and second holding shuttles 1 and 2 that have passed there such that they hold the rear and front faces 74 and 75 of the transport case 7 from opposite sides.

By contrast, if the first and second holding shuttles 1 and 2 are found to be holding a transport case 7, the controller 400 keeps them momentarily at rest at the regulation standby position Sp1. The controller 400 then moves the first and second holding shuttles 1 and 2 holding the transport case 7 from the regulation standby position Sp1 to the junction point 115 so that they will not interfere with (as by making contact with) a transport case 7 fed from the feeding device 300.

Here, the controller 400 may move the first and second holding shuttles 1 and 2 with such timing that the transport case 7 held by them does not make contact with either of the first and second rests 621 and 622 in the feeder 320, or may adjust speed after they have moved to the junction point 115 to avoid contact.

With this configuration, it is possible to make all the first and second holding shuttles 1 and 2 that are fed to the junction point 115 hold a transport case 7. In this way, it is possible to prevent some first and second holding shuttles 1 and 2 from being fed to the first operating station St1 without holding a transport case 7, and thus to achieve high operation efficiency.

In the embodiment, the first rest 621 is fitted to the side mover 611 and the second rest 622 is fitted to the top mover 612. This is not meant as any limitation. For example, the first and second rests 621 and 622 may be fitted to one feed-out mover 61. The one feed-out mover 61 may be either a side mover or a top mover. Or, it may be arranged elsewhere.

<Operation at the Branch Point 116>

As described above, in the transport apparatus A, in the first operating station St1, which is arranged midway along the second straight part 112, an operation of arranging a container Cv in a transport case 7 is performed. The transport case 7 having the container Cv arranged in it in the first operating station St1 is fed via the branching transport passage 130 to the second operating station St2, which involves the next manufacturing process. To the first operating station St1, a container Cv is fed from another, unillustrated, manufacturing process. The so fed container Cv is arranged in the transport case 7.

In the first operating station St1, the number of containers Cv may be insufficient to be arranged in transport cases 7 at hand. In that case, the controller 400 may keep transport cases 7 at rest in the first operating station St1 to wait for containers Cv to be fed in. However, in a case where a large number of transport cases 7 are being handled, keeping them at rest in the first operating station St1 until containers Cv are fed in leads to incoming transport cases 7 accumulating and stagnating.

To cope with that, in a case where the number of containers Cv is insufficient, the controller 400 controls the main transport mechanism 210 to let transport cases 7 pass through the first operating station St1 so that they will not accumulate there. Thus, to the branch point 116 which is located downstream of the transport cases 7 in the transport direction Tr1, transport cases 7 with a container Cv arranged in them and transport cases 7 with no container Cv arranged in then are transported.

Figure 17:
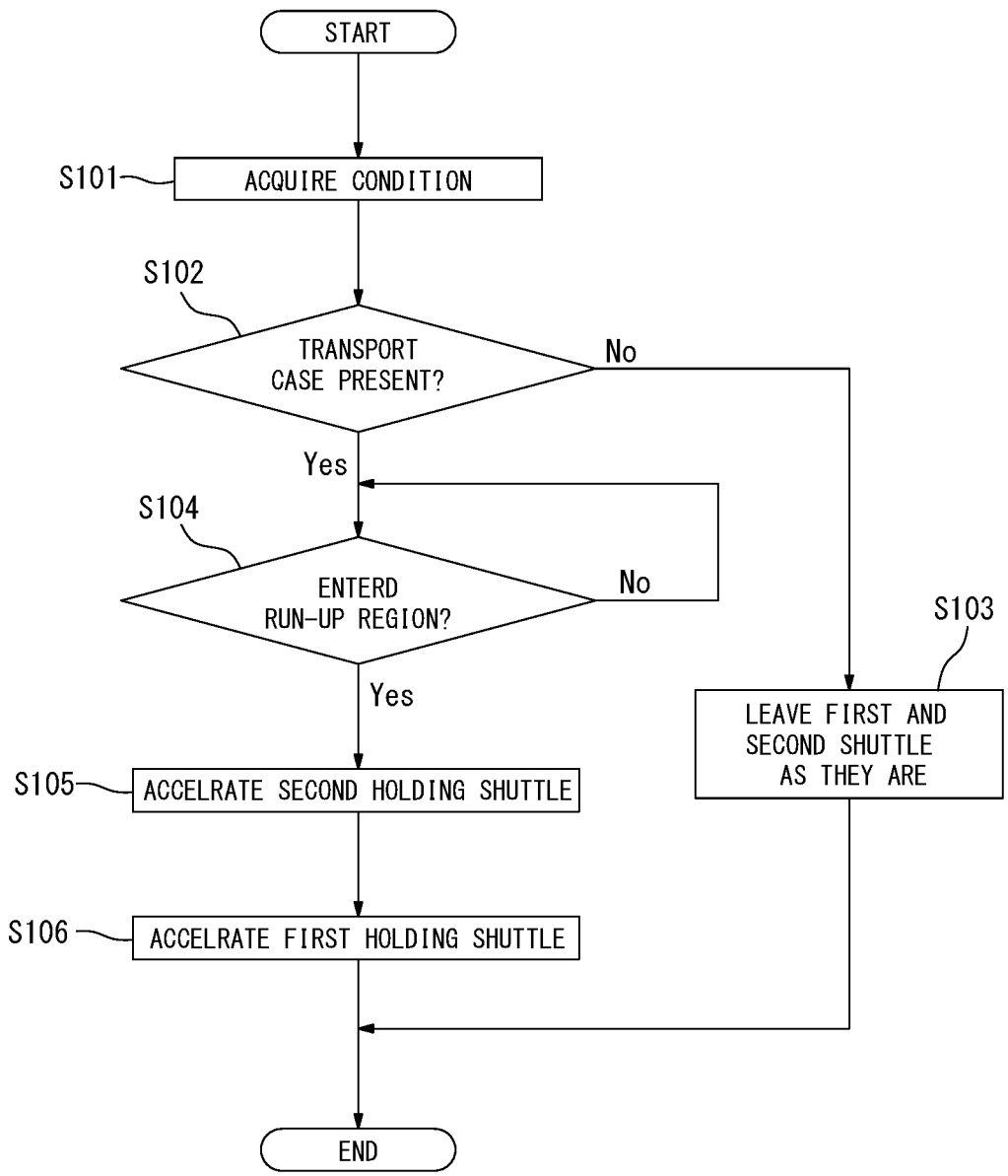
FIG. 17 is a flow chart showing the operation of a main transport mechanism at a branch point.

The operation at the branch point 116 will now be described in detail. FIG. 17 is a flow chart showing the operation of the main transport mechanism 210 at the branch point 116. The controller 400 acquires from the condition sensor 232 condition information that conveys the condition of a transport case 7 that is transported to the run-up region 117 (step S101). The condition information includes, for example, information as to whether a container Cv is arranged in the transport case 7. This is not meant as any limitation. It may include any other information. The condition information includes information for a judgment of whether to feed the transport case 7 to the second operating station St2.

Based on the condition information from the condition sensor 232, the controller 400 checks whether a container Cv is arranged in the transport case 7 (step S102). If no container Cv is arranged in the transport case 7 ("No" in step S102), the controller 400 maintains the operation of the first and second holding shuttles 1 and 2 (step S103) and ends the branching operation.

Maintaining the operation of the first and second holding shuttles 1 and 2 permits the transport case 7 to be transported while being held by the first and second holding shuttles 1 and 2. The first and second holding shuttles 1 and 2 then move, at the branch point 116, from the second straight part 112 to the second curved part 114. At this time, the first and second claws 16 and 26 of the first and second holding shuttles 1 and 2 engage with the recessed parts 741 and 751 in the transport case 7. Thus the first and second holding shuttles 1 and 2 pull the transport case 7 toward the second curved part 114.

If based on the condition information it is judged that a container Cv is arranged in the transport case 7 ("Yes" at step S102), the controller 400 checks whether the transport case 7 has reached the run-up region 117 (step S104). The controller 400 waits for the transport case 7 to reach the run-up region 117 ("No" at step S104 leads to step S104 being repeated).

As described above, in the run-up region 117, the bottom face of the transport case 7 is supported on the branching conveyor 231. In the run-up region 117, the transport case 7 is transported by the first and second holding shuttles 1 and 2 and the branching conveyor 231. Meanwhile, the transport speed of the branching conveyor 231 is equal to the transport speed of the first and second holding shuttles 1 and 2. This is not meant as any limitation. As will be described below, the transport speeds of the branching conveyor 231 and the first and second holding shuttles 1 and 2 may be determined so that, as the first and second holding shuttles 1 and 2 move away from the transport case 7, the transport case 7 is stably transported on the branching conveyor 231.

When the transport case 7 reaches the run-up region 117 ("Yes" at step S104), the controller 400 controls the linear motor driver 43 to accelerate the second holding shuttle 2 (step S105). This causes the second face-pushing arm 22 and the second clawed arm 23 of the second holding shuttle 2 to leave the front face 75 of the transport case 7.

The controller 400 also controls the linear motor driver 43 to decelerate the first holding shuttle 1 (step S106). Thus causes the first face-pushing arm 12 and the first clawed arm 13 of the first holding shuttle 1 to leave the rear face 74 of the transport case 7. Thus, the first and second holding shuttles 1 and 2 move away from the transport case 7.

The transport case 7 is then transported by the branching conveyor 231 toward the branching transport passage 130. Within the branching transport passage 130, the transport case 7 is transported while being guided by the branching guide 131. By being guided by the branching guide 131, the transport case 7 is transported in the branching transport passage 130 while maintaining the reference orientation Gs.

At the branch point 116, the branching guide 131 is formed so as to be wider in an upstream-side part of it in the transport direction Tr1. Owing to that, when the first and second holding shuttles 1 and 2 move away from the transport case 7, even if the transport case 7 is displaced or loses orientation, it can be brought back into proper orientation and position before entering the branching transport passage 130.

The transport case 7 having the container Cv arranged in it is transported in the branching transport passage 130 to reach the curved transport passage 140. The curved transport passage 140 is accommodated inside the second operating station St2. In the embodiment, the transport case 7 is transported in the curved transport passage 140 by a transport mechanism provided in the time point T2, for example, a transport wheel having formed in its outer circumferential face a recessed part with which the transport case 7 can fit.

The second operating station St2 puts a lid on the container Cv transported while being arranged in the transport case 7, and moves only the container Cv out of the transport apparatus A. The transport case 7 is then, with no container Cv arranged in it, fed from the curved transport passage 140 to the joining transport passage 120. After that, the transport case 7 is transported one again in the joining transport passage 120 to join the main transport passage 110 at the junction point 115.

As described above, when a transport case 7 is in the main transport passage 110, it is held by the first and second holding shuttles 1 and 2 from frontward and rearward of it in the transport direction Tr1. The first and second holding shuttles 1 and 2 can be operated independently by the linear motor driver 43. Thus, it is possible to easily and reliably move over the transport case 7 from the feeding device 300 to the main transport mechanism 210 at the junction point 115.

Likewise, simply by changing the transport speed of the first and second holding shuttles 1 and 2, it is possible to easily switch the transport direction of the transport case 7 at the branch point 116.

While the above description deals with an example where a branching conveyor 231 is used as the branching transport mechanism 230, this is not meant as any limitation. Instead, for example, shuttles that operate inside the branching transport passage 130 along it and that are configured similarly to the first and second holding shuttles 1 and 2 may be used. In that case, the shuttles in the branching transport mechanism 230 may hold an article from the side opposite to the side from which the first and second holding shuttles 1 and 2 in the main transport mechanism 210 holds it; or they may hold an article from under its bottom face.

While, in the embodiment, transport cases 7 transported into the branching transport passage 130 return to the joining transport passage 120 via the curved transport passage 140, this is not meant as any limitation. The branching transport passage 130 may feed transport cases 7 to another apparatus outside the transport apparatus A. The joining transport passage 120 may then be fed with transport cases 7 from another apparatus, or transport cases 7 may be accumulated separately to be fed out one after another.

As described above, by controlling the transport passage 100, the transport mechanism 200, and the feeding device 300 in a comprehensive manner with the controller 400 permits transport cases 7 to be transported stably for a long period without transport cases 7 stagnating or coming off.

The monitor 212 and the condition sensor 232 mentioned above may be configured to shine light and sense condition based on the condition of the light sensed, or may be configured to take an image with an image sensor and transmit the taken data to the controller 400.

While the embodiment deals with a configuration that includes a monitor 212, this is not meant as any limitation. In the main transport passage 110, transport cases 7 to be returned to the first straight part 111 are selected at the branch point 116. Accordingly, the holding condition of transport cases 7 by the first and second holding shuttles 1 and 2 reaching the regulation standby position Sp1 can be acquired based the operation at the branch point 116. Thus, the monitor 212 may be omitted. In the embodiment, both information based on the operation at the branch point 116 and information from the monitor 212 are used for even higher accuracy.

The embodiments of the present invention described above are in no way meant to limit the scope of the present invention. Any embodiments of the present invention allow for any modifications without departure from the spirit of the invention.

REFERENCE SIGNS LIST

- 100 transport passage
- 110 main transport passage
- 111 first straight part
- 112 second straight part
- 113 first curved part
- 114 second curved part
- 115 junction point
- 116 branch point
- 117 run-up region
- 118 guide
- 119 bottom face guide
- 120 joining transport passage
- 121 joining guide
- 130 branching transport passage
- 131 branching guide
- 140 curved transport passage
- 200 transport mechanism
- 210 main transport mechanism
- 211 main transport conveyor
- 212 monitor
- 1 first holding shuttle
- 11 body
- 12 first face-pushing arm
- 13 first clawed arm
- 14 upper roller
- 15 lower roller
- 16 first claw
- 2 second holding shuttle
- 21 body
- 22 second face-pushing arm
- 23 second clawed arm
- 24 upper roller
- 25 lower roller
- 26 second claw
- 3 rail
- 3a rail
- 3b rail
- 31 main rail part
- 32 grooved rail part
- 33 flat rail part
- 4 linear driver
- 41 coil
- 42 magnet
- 43 controller
- 44 linear motor driver
- 220 joining transport mechanism
- 221 joining conveyor
- 230 branching transport mechanism
- 231 branching conveyor
- 232 condition sensor
- 300 feeding device
- 310 discharger
- 51 first star wheel
- 511 body
- 512 engagement projection
- 513 locking projection
- 514 pushing projection
- 52 second star wheel
- 521 body
- 522 engagement projection
- 523 locking projection
- 524 pushing projection
- 53 first driver
- 54 second driver
- 320 feeder
- 321 groove
- 61 feed-out mover
- 611 side mover
- 6111 belt surface
- 612 top mover
- 6121 belt surface
- 62 contact rest
- 621 first rest
- 622 second rest
- 623 first contact face
- 624 second contact face
- 400 controller
- 401 processing circuit
- 402 storage circuit
- A transport apparatus
- 7 transport case
- Cv container
- Gs reference orientation
- Jp1 joining standby position
- Rt1 rotation direction
- Sp1 regulation standby position
- St1 first operating station
- St2 second operating station
- Tr1 transport direction

The invention claimed is:

1. A transport apparatus for a transported piece, the transport apparatus comprising:
a main transport passage in which the transported piece is transported;
a branching transport passage that connects to a branch point provided in the main transport passage, the branching transport passage extending in a direction different from the main transport passage;
a main transport mechanism that transports the transported piece in the main transport passage;
a branching transport mechanism that transports the transported piece in the branching transport passage; and
a controller,
wherein the main transport mechanism includes:
a rail arranged along the main transport passage,
a first holding shuttle and a second holding shuttle arranged on the rail,
the first and second holding shuttles holding a rear face and a front face, respectively, of the transported piece in the transport direction, and
a linear driver configured to drive the first and second holding shuttles independently,
wherein, in a run-up region provided upstream, in a transport direction, of the branch point in the main transport passage, the main transport mechanism and the branching transport mechanism both transport the transported piece, and wherein the controller controls the linear driver to continuously move the first and second holding shuttles while also, when the transported piece is fed to the branching transport passage, in the run-up region, the linear driver accelerates the second holding shuttle such that a movement speed thereof is higher than a transport speed of the branching transport mechanism and, after the second holding shuttle moves away from the transported piece, the linear driver decelerates the first holding shuttle such that a movement speed thereof is lower than the transport speed of the branching transport mechanism, so as to move the first and second holding shuttles away from the transported piece before the transported piece reaches the branch point so that the main transport mechanism finishes transporting the transported piece before the transported piece reaches the branch point.

2. The transport apparatus according to claim 1, wherein the branching transport mechanism is a top chain conveyor on top of which the transported piece can be arranged, and a bottom face guide is arranged in the main transport passage, the bottom face guide supporting the transported piece by making contact with a bottom face thereof.

3. The transport apparatus according to claim 1, wherein the main transport passage has a straight part and a curved part, the curved part being connected to the straight part at the branch point, and the branching transport passage connects to a downstream end of the straight part in the transport direction, the branching transport passage extending in a direction extending the straight part.

* * * * *